(12) United States Patent
Sawai

(10) Patent No.: US 10,315,483 B2
(45) Date of Patent: Jun. 11, 2019

(54) VEHICLE DAMPING SYSTEM AND VEHICLE

(71) Applicant: Yamaha Hatsudoki Kabushiki Kaisha, Shizuoka-ken (JP)

(72) Inventor: Seiji Sawai, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 140 days.

(21) Appl. No.: 15/696,475

(22) Filed: Sep. 6, 2017

(65) Prior Publication Data

US 2018/0072126 A1 Mar. 15, 2018

(30) Foreign Application Priority Data

Sep. 9, 2016 (JP) .................. 2016-176961

(51) Int. Cl.
*B60G 21/00* (2006.01)
*B60G 21/06* (2006.01)
(Continued)

(52) U.S. Cl.
CPC ........... *B60G 21/005* (2013.01); *B60G 17/08* (2013.01); *B60G 21/06* (2013.01); *F16F 9/061* (2013.01);
(Continued)

(58) Field of Classification Search
CPC ...... B60G 21/005; B60G 17/08; B60G 21/06; B60G 2500/11; B60G 2300/322; B60G 2204/8304; B60G 2204/82; B60G 2204/81; B60G 2202/24; B60G 2800/014; B60G 2500/10; B60G 2800/012; F16F 9/061; F16F 9/325; F16F 9/466; F16F 9/34; F16F 2230/186; E02F 9/2257
See application file for complete search history.

(56) References Cited

U.S. PATENT DOCUMENTS 1,956,712 A 5/1934 Deutsch
1,963,533 A 6/1934 Svensson
(Continued)

FOREIGN PATENT DOCUMENTS

CA 2978406 A1 * 3/2018 ........... B60G 21/005
EP 0980774 A2 2/2000
(Continued)

OTHER PUBLICATIONS

Search Report dated Jan. 22, 2018, for corresponding EP Patent Application No. 17188960.3.

*Primary Examiner* — Karen Beck
(74) *Attorney, Agent, or Firm* — HEA Law PLLC

(57) ABSTRACT

An oil channel that connects a right damper and a left damper includes a switching valve arranged between a right oil channel ER and a left oil channel EL. The switching valve includes a valve main body in which a first switching channel is formed for connecting the right oil channel ER and the left oil channel EL. The valve main body is rotatable to a first position where the first switching channel connects the right oil channel ER and the left oil channel EL to each other and to a second position different from the first position. According to this damping system, it is possible to adjust oil flow in the oil channel by performing a simple operation for the switching valve.

12 Claims, 16 Drawing Sheets

(51) Int. Cl.
  *B60G 17/08* (2006.01)
  *F16F 9/06* (2006.01)
  *F16F 9/32* (2006.01)
  *F16F 9/46* (2006.01)
  *E02F 9/22* (2006.01)
  *F16F 9/34* (2006.01)

(52) U.S. Cl.
  CPC .............. *F16F 9/325* (2013.01); *F16F 9/466* (2013.01); *B60G 2202/24* (2013.01); *B60G 2204/81* (2013.01); *B60G 2204/82* (2013.01); *B60G 2204/8304* (2013.01); *B60G 2300/322* (2013.01); *B60G 2500/10* (2013.01); *B60G 2500/11* (2013.01); *B60G 2800/012* (2013.01); *B60G 2800/014* (2013.01); *E02F 9/2257* (2013.01); *F16F 9/34* (2013.01); *F16F 2230/186* (2013.01)

(56) References Cited

U.S. PATENT DOCUMENTS

| | | | |
|---|---|---|---|
| 4,743,000 A * | 5/1988 | Karnopp | B60G 17/0152 188/266.5 |
| 5,163,703 A * | 11/1992 | Shal | F16F 9/462 188/266.3 |
| 5,181,696 A | 1/1993 | Abe | |
| 5,219,181 A * | 6/1993 | Lund | B60G 17/0162 280/124.157 |
| 5,350,187 A * | 9/1994 | Shinozaki | B60G 17/0152 188/282.4 |
| 5,935,181 A * | 8/1999 | Iwasaki | B60G 17/0164 180/197 |
| 2003/0075883 A1* | 4/2003 | Jin | B60G 11/27 280/5.508 |
| 2012/0112424 A1 | 5/2012 | Cronquist et al. | |
| 2014/0125018 A1* | 5/2014 | Brady | B60G 17/016 280/5.519 |
| 2016/0200164 A1* | 7/2016 | Tabata | B60G 21/0553 280/5.508 |
| 2017/0361674 A1* | 12/2017 | Ahmadian | B60G 11/27 |

FOREIGN PATENT DOCUMENTS

| | | | | |
|---|---|---|---|---|
| GB | 2444250 A | 6/2008 | | |
| JP | H06455 B2 * | 1/1994 | .......... | B60G 21/007 |
| JP | H06-72127 A | 3/1994 | | |
| JP | H07-32851 A | 2/1995 | | |
| JP | H08-132846 A | 5/1996 | | |
| WO | 2016/147677 A1 | 9/2016 | | |

* cited by examiner

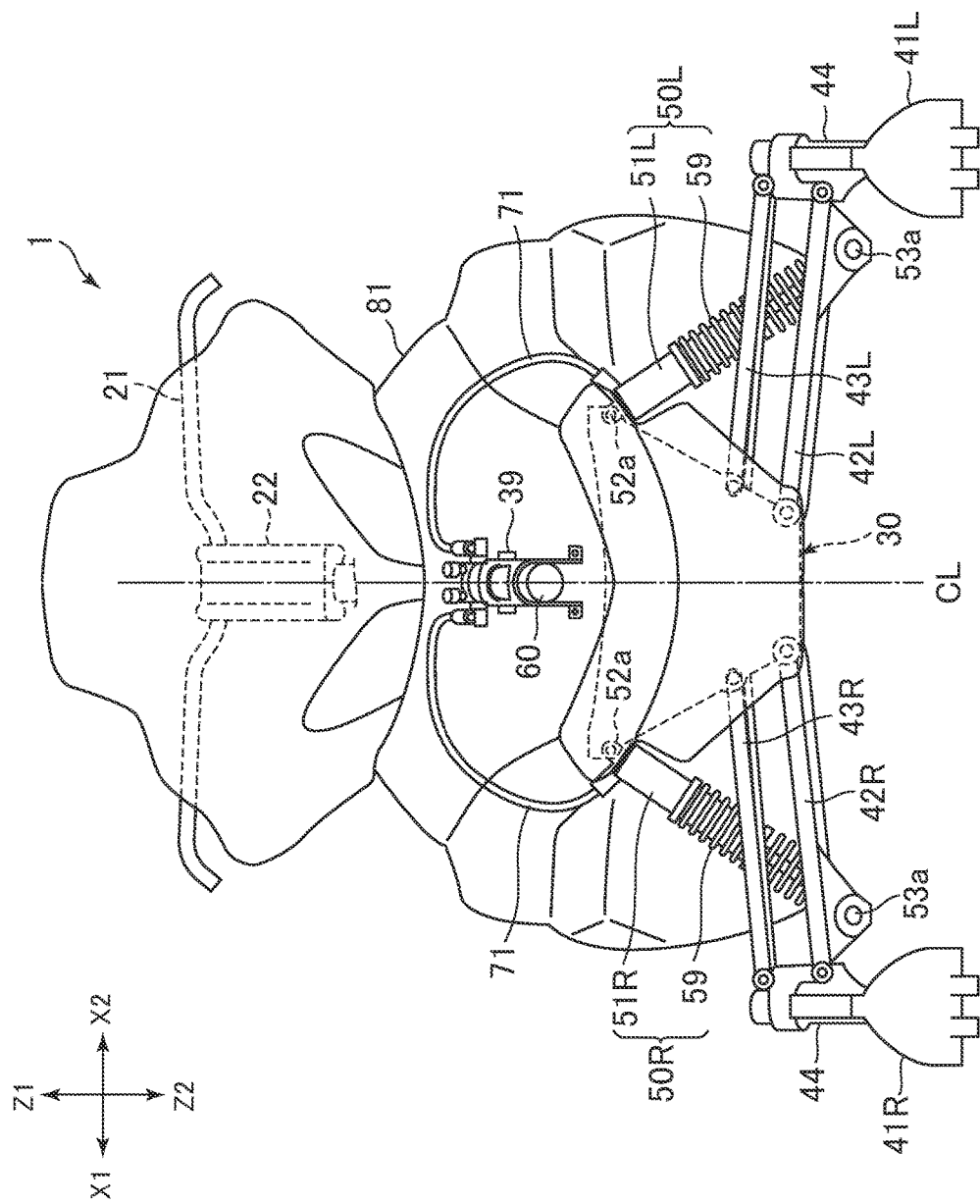

VEHICLE DAMPING SYSTEM AND VEHICLE

CROSS-REFERENCE TO RELATED APPLICATION

The present application claims priority from Japanese application JP2016-176961 filed on Sep. 9, 2016, the content of which is hereby incorporated by reference in its entirety into this application.

BACKGROUND OF THE INVENTION

1. Field of the Invention

The present invention relates to a damping system mounted on a vehicle, such as a snowmobile, an automobile, etc., for damping vertical movement of a member, such as a ski, a wheel, etc., that supports a vehicle body, and a vehicle including the damping system.

2. Description of the Related Art

Japanese Patent Laid-open Publication No. H07-32851 (hereinafter referred to as Patent Literature 1) discloses a vehicle including an oil channel that connects a damper for damping vertical movement of a front wheel (for example, the right front wheel) and a damper for damping vertical movement of a rear wheel (for example, the right rear wheel) to each other (the damper for damping vertical movement of the front wheel will be hereinafter referred to as a "front damper", while the damper for clamping vertical movement of the rear wheel will be hereinafter referred to as a "rear damper"). A middle cylinder is arranged in a midway section of the oil channel (the middle cylinder is referred to as a "reserve tank" in Patent Literature 1). The middle cylinder has an oil chamber formed therein, and the front damper and the rear damper are connected to the oil chamber in the middle cylinder. For example, when a vehicle turns left and the right front wheel and the right rear wheel thus move upward together relative to the vehicle body, oil flows from the two respective dampers into the oil chamber of the middle cylinder. Meanwhile, when the front and rear wheels move in mutually opposite directions, oil flows from one damper into the other damper.

In Patent Literature 1, the middle cylinder includes a base valve. The base valve has three communication channels formed therein that connects oil channels extending between the front and rear dampers and the oil chamber of the middle cylinder. The first communication channel includes a check valve that allows oil to flow from the oil chamber of the middle cylinder to the oil channel extending between the front and rear dampers. The second communication channel includes a check valve that allows oil to flow to the oil chamber of the middle cylinder from the oil channel extending between the front and rear dampers. Further, the third communication channel is a center hole formed in the base valve. The base valve includes an adjustment screw rod movable in the axial direction of the adjustment screw rod so as to be inserted into and removed from the center hole. The extent of opening of the communication channel is adjustable based on the position of the adjustment screw rod.

Japanese Patent Laid-open Publication No. H08-132846 (hereinafter referred to as Patent Literature 2) discloses a vehicle including an oil channel that connects a damper for damping vertical movement of the right front wheel and a damper for damping vertical movement of the left front wheel to each other (the damper for damping vertical movement of the right front wheel will be hereinafter referred, to as a "right damper", while the damper for damping vertical movement of the left front wheel will be hereinafter referred to as a "left damper"). A middle cylinder is arranged in a midway section of the oil channel (the middle cylinder is referred to as a "pressure regulating cylinder" in Patent Literature 2). The oil channel connecting the right and left dampers includes an oil chamber that connects the right and left dampers without going through the middle cylinder. The oil chamber is divided into two oil chambers. The right damper is connected to one oil chamber and the left damper is connected to the other oil chamber. These two oil chambers communicate with each other via a throttle. In Patent Literature 2, for example, when the right damper contracts and the left damper expands, oil moves from the right damper to the left damper through the throttle. This generates a large damping effect. A vehicle disclosed in Patent Literature 2 includes a spool valve for adjusting the throttling degree of the throttle. The spool valve is movable, and the throttling degree corresponds to the position of the spool valve.

SUMMARY OF THE INVENTION

The above described conventional vehicles includes a structure for adjusting the amount of oil moving between the two dampers. However, the structure is complicated, and adjustment of the amount of oil may take substantial time to be completed.

One of the objects of the present invention is to provide a damping system and a vehicle capable of having an oil flow in an oil channel be adjusted by performing a simple operation.

(1) A vehicle damping system according to one embodiment disclosed in this specification includes: a first damper including a first cylinder filled with oil and a first piston separating an inside of the first cylinder into two oil chambers, the first piston including an orifice for communication between the two oil chambers, the first piston being configured to move in the first cylinder in accordance with a vertical movement of a first vehicle body support member that supports a vehicle body; a second damper including a second cylinder filled with oil and a second piston separating an inside of the second cylinder into two oil chambers, the second piston including an orifice for communication between the two oil chambers, the second piston being configured to move in the second cylinder in accordance with a vertical movement of a second vehicle body support member that supports the vehicle body; and an oil channel that connects the first cylinder and the second cylinder and allows oil to move between the first cylinder and the second cylinder. The oil channel includes a first oil channel connected to the first cylinder, a second oil channel connected to the second cylinder, and a switching valve arranged between the first oil channel and the second oil channel. The switching valve includes a valve main body having a first switching channel formed therein for connecting the first oil channel and the second oil channel. The valve main body is rotatable to a first position where the first switching channel connects the first oil channel and the second oil channel to each other and to a second position different from the first position. This damping system enables users to adjust oil flow in the oil channel by performing a simple operation for the switching valve, since the valve main body is rotatable. In embodiment, of this damping system, the switching valve may be set to two positions only or three positions. That is, the state of the oil channel may be switched to three states.

(2) The damping system according to (1) may further include a middle cylinder including a piston, an oil chamber, and a gas chamber; the piston separating the middle cylinder into the oil chamber and the gas chamber. The first oil channel and the second oil channel may be connected to the oil chamber of the middle cylinder. The oil channel may include a first bypass channel connecting the first oil channel and the second oil channel to each other without going through the oil chamber of the middle cylinder. The switching valve may foe arranged in the first bypass channel. When the switching valve is at the first position, the first bypass channel may connect the first oil channel and the second oil channel via the first switching channel.

(3) In the damping system according to (1), the valve main body may have a second switching channel formed therein. The second switching channel may connect the first oil channel and the second oil channel to each other when the valve main body is arranged at the second position. The valve main body may be rotatable to the first position, the second position, and a third position where the valve main body disconnects the first oil channel and the second oil channel from each other. This damping system can achieve three states with different damping effects.

(4) In the damping system according to (1), the switching valve may include an operation member for operating the valve main body, and the operation member is rotatable integrally with the valve main body. This damping system enables users to perform a simple operation for the switching valve.

(5) Another vehicle damping system according to one embodiment disclosed in this specification including: a first damper including a first cylinder filled with oil and a first piston that separates an inside of the first cylinder into two oil chambers, the first piston including an orifice for communication between the two oil chambers, the first piston being configured to move in the first cylinder in accordance with a vertical movement of a first vehicle body support member that supports a vehicle body; a second damper including a second cylinder filled with oil and a second piston that separates an inside of the second cylinder into two oil chambers, the second piston including an orifice for communication the two oil chambers, the second piston being configured to move in the second cylinder in accordance with a vertical movement of a second vehicle body support member that supports the vehicle body; and an oil channel that connects the first cylinder and the second cylinder to each other and allows oil to move between the first cylinder and the second cylinder. The oil channel includes a first oil channel connected to the first cylinder, a second oil channel connected to the second cylinder, and a switching valve arranged between the first oil channel and the second oil channel. The switching valve includes a valve main body having a first switching channel and a second switching channel each formed therein, and the valve main body is switchable into a first state in which the first switching channel connects the first oil channel and the second oil channel to each other, a second state in which the second switching channel connects the first oil channel and the second oil channel to each other, and a third state in which the valve main body disconnects the first oil channel and the second oil channel from each other. Since two switching channels are formed in the valve main body, this damping system allows oil flow to be switched into three states by user's a simpler operation, compared to a conventional damping system. Note that in this damping system, the valve main body is not necessarily rotatable.

(6) The damping system, according to (5) may further include a middle cylinder including a piston, an oil chamber, and a gas chamber, the piston separating the middle cylinder into the oil chamber and the gas chamber. The first oil channel and the second oil channel may be connected to the oil chamber of the middle cylinder. The oil channel may include a first bypass channel for connecting the first oil channel and the second oil channel without going through the oil chamber of the middle cylinder. When the switching valve is in the first state, the first bypass channel may connect the first oil channel and the second oil channel via the first switching channel.

(7) In the damping system according to (5) or (6), when the switching valve is in the first state, the first bypass channel may connect the first oil channel and the second oil channel via the first switching channel. When the switching valve is in the second state, the first bypass channel may connect the first oil channel and the second oil channel via the second switching channel. The second switching channel may cause a larger resistance against oil flow than the first switching channel. According to this embodiment of the damping system, it is possible to change the smoothness of the oil flow between two dampers to three levels.

(8) In the damping system according to (6), the oil channel may include a first throttle arranged in the first oil channel, a second throttle arranged in the second oil channel, and a second bypass channel for connecting the first oil channel and the second oil channel to the middle cylinder without going through the first throttle and the second throttle. When the switching valve is in the first state, the first bypass channel may connect the first oil channel and the second oil channel via the first switching channel. When the switching valve is in the second state, the second switching channel may connect the first oil channel and the second oil channel to the second bypass channel. According to this damping system, it is possible to achieve a state in which first bypass channel works, a state in which the second bypass channel E2 works, and a state in which neither the first bypass channel nor the second bypass channel works.

(9) In the damping system according to (5), the valve main body may be rotatable to a position corresponding to the first state, a position corresponding to the second state, and a position corresponding to the third state. This damping system enables users to change oil flow between three different states by performing a simpler operation, compared to a conventional damping system.

(10) A vehicle according to one embodiment disclosed in this specification including: the first vehicle body support member; the second vehicle body support, member; a first arm connecting the first vehicle body support member and a vehicle body such that the first vehicle body support member is movable up and down relative to the vehicle body; and a second arm connecting the second vehicle body support member and the vehicle body such that the second vehicle body support member is movable up and down relative to the vehicle body. The first damper is connected to the vehicle body and the first arm, and the second damper is connected to the vehicle body and the second arm.

(11) In the vehicle according to (10), the switching valve may include a valve operation member for operating the valve main body, and the valve operation member may be exposed outside the vehicle body. This vehicle enables an operator to readily access the valve operation member.

(12) The vehicle according to (10) may further include a steering handle for steering the first vehicle body support member and the second vehicle body support member. The switching valve may include a valve operation member for operating the valve main body. The valve operation member may be disposed in a vicinity of the steering handle. This vehicle enables an operator (a driver) to readily access the valve operation member.

(13) The vehicle according to (10) may further include a steering handle for steering the first vehicle body support member and the second vehicle body support member, and a display unit. The switching valve may include a valve operation member for operating the valve main body, and the valve operation member may be disposed between the steering handle and the display unit. This vehicle enables an operator (driver) to readily access the valve operation member.

BRIBE DESCRIPTION OF THE DRAWINGS

FIG. 10B is a front view of the snowmobile shown in FIG. 9A;

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises," "comprising," "includes," and "including," when used in this specification, specify the presence of stated features, operations, elements, and/or components, but do not preclude the presence or addition of one or more other features, operations, elements, components, and/or groups thereof.

Unless otherwise defined, all terms (including technical and scientific terms) used herein have the same meaning as commonly understood by one including ordinary skill in the art to which this invention belongs. It will be further understood that terms, such as those defined in commonly used dictionaries, should be interpreted as including a meaning that is consistent with their meaning in the context of the relevant art and the present disclosure and will not be interpreted in an idealized or overly formal sense unless expressly so defined herein.

In describing the invention, it will be understood that a number of techniques are disclosed. Each of these includes individual benefit and each can also be used in conjunction with one or more, or in some cases all, of the other disclosed techniques. Accordingly, for the sake of clarity, this description will refrain from repeating every possible combination of the individual techniques in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
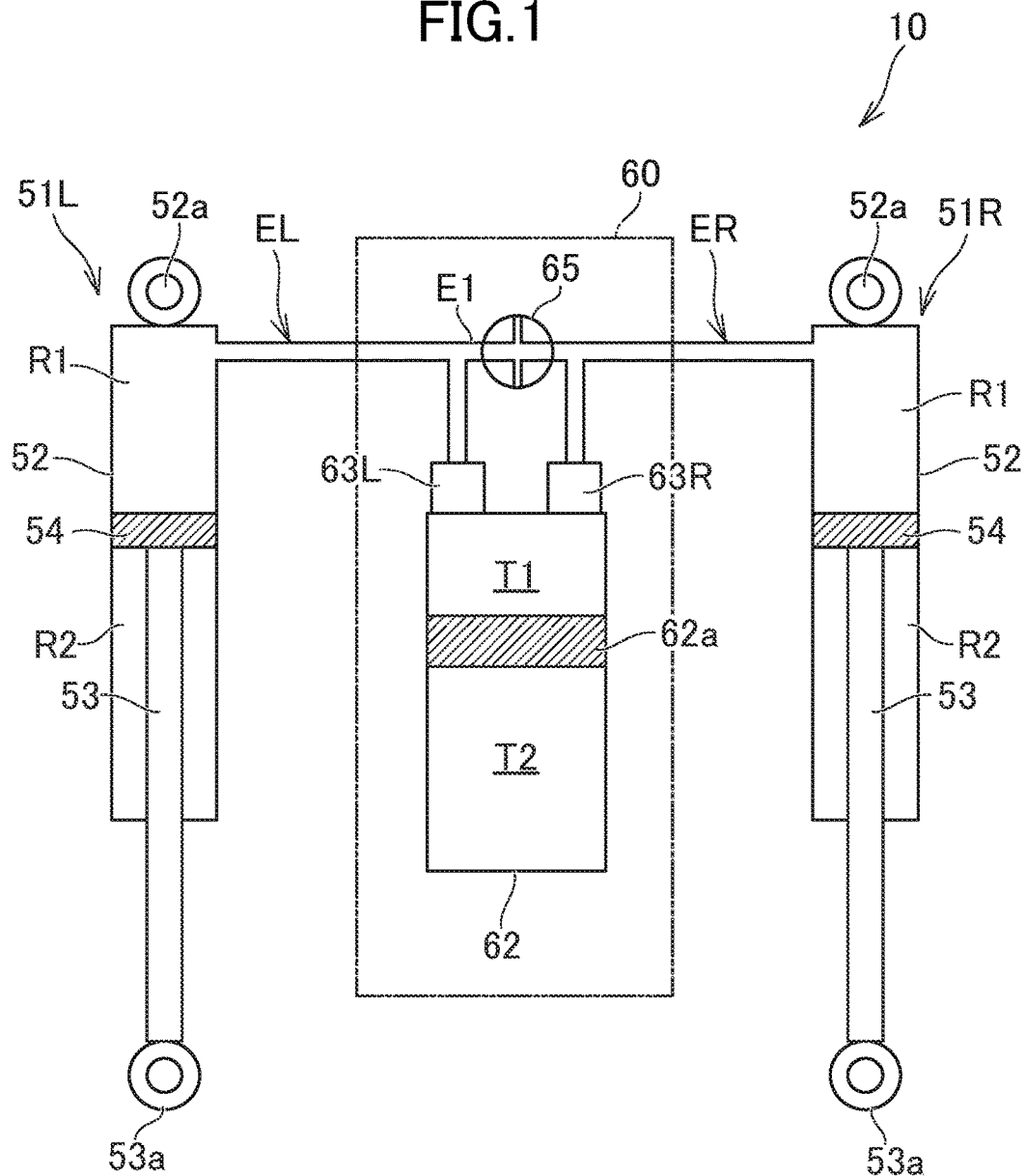
FIG. 1 shows a vehicle damping system, according to an embodiment of the present invention.
Figure 2:
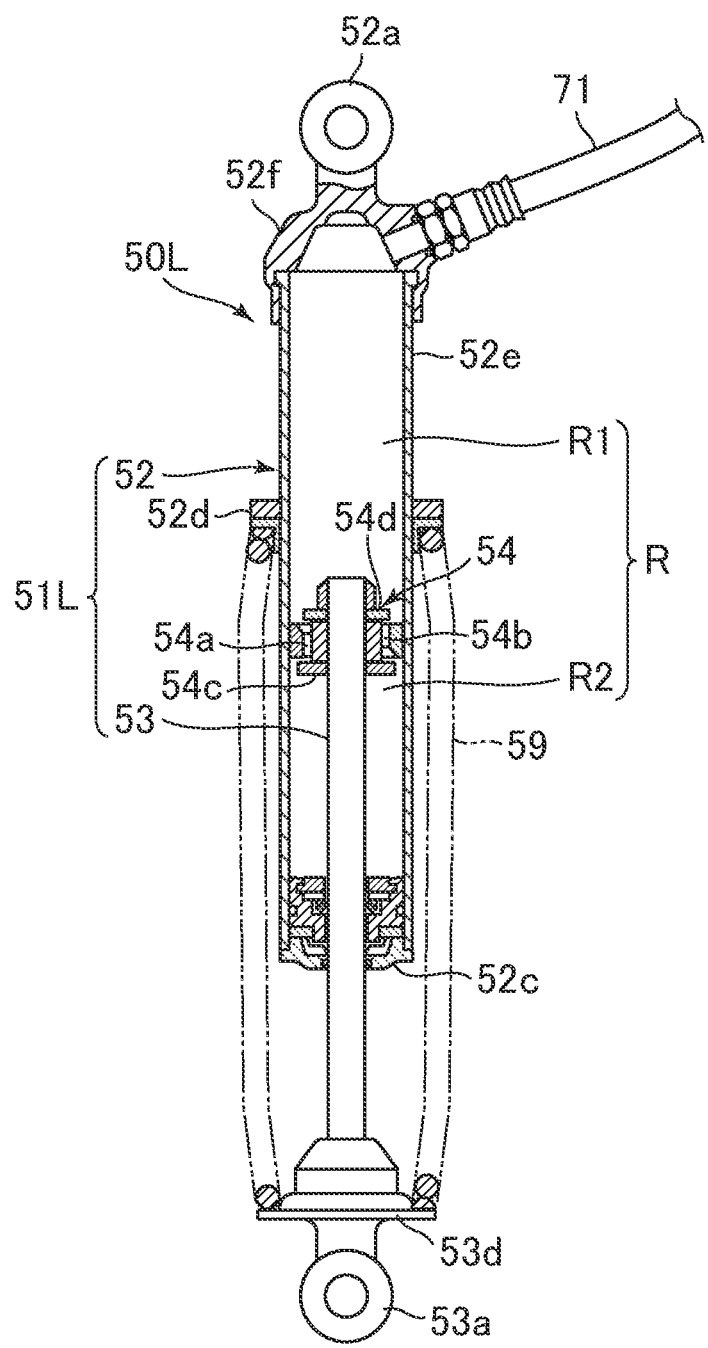
FIG. 2 is a cross sectional view showing an example of a left damper of a damping system.
Figure 3A:
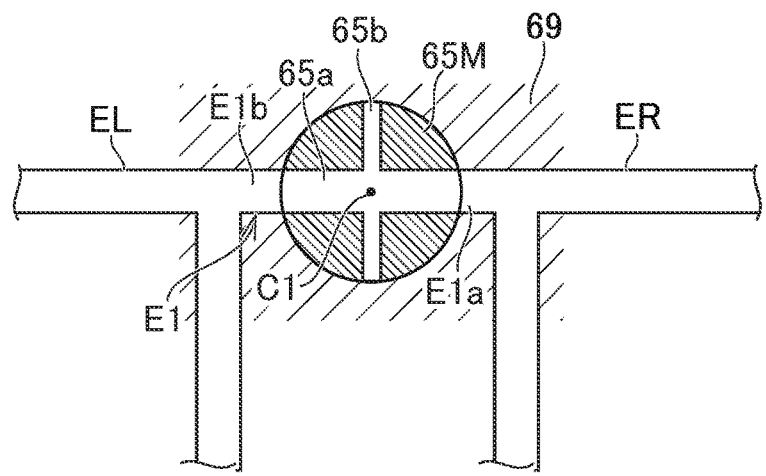
FIG. 3A illustrates a switching valve provided to an oil channel, wherein the switching valve is positioned at a first position.
Figure 3B:
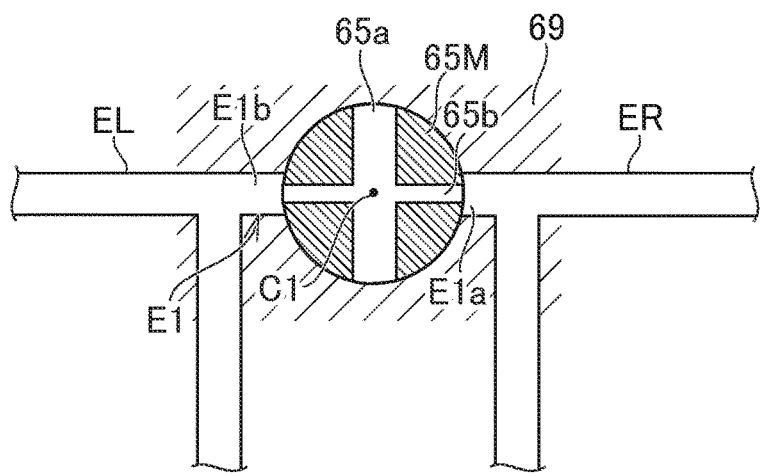
FIG. 3B illustrates the switching valve positioned at a second position.
Figure 3C:
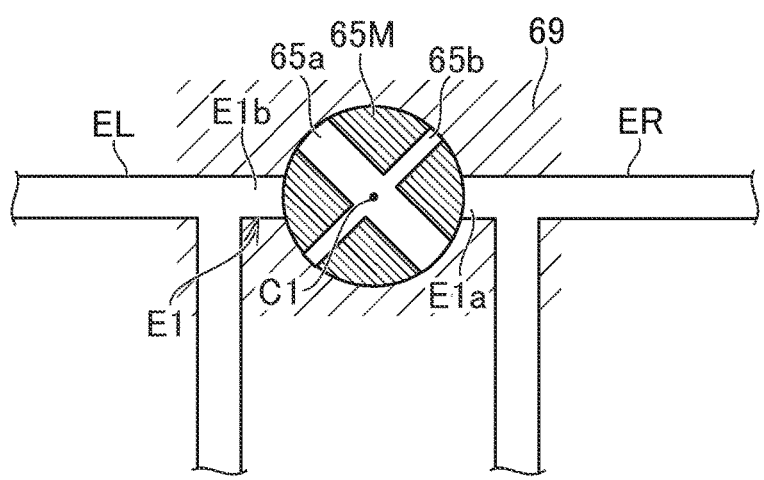
FIG. 3C illustrates the switching valve positioned at a third position.
Figure 4A:
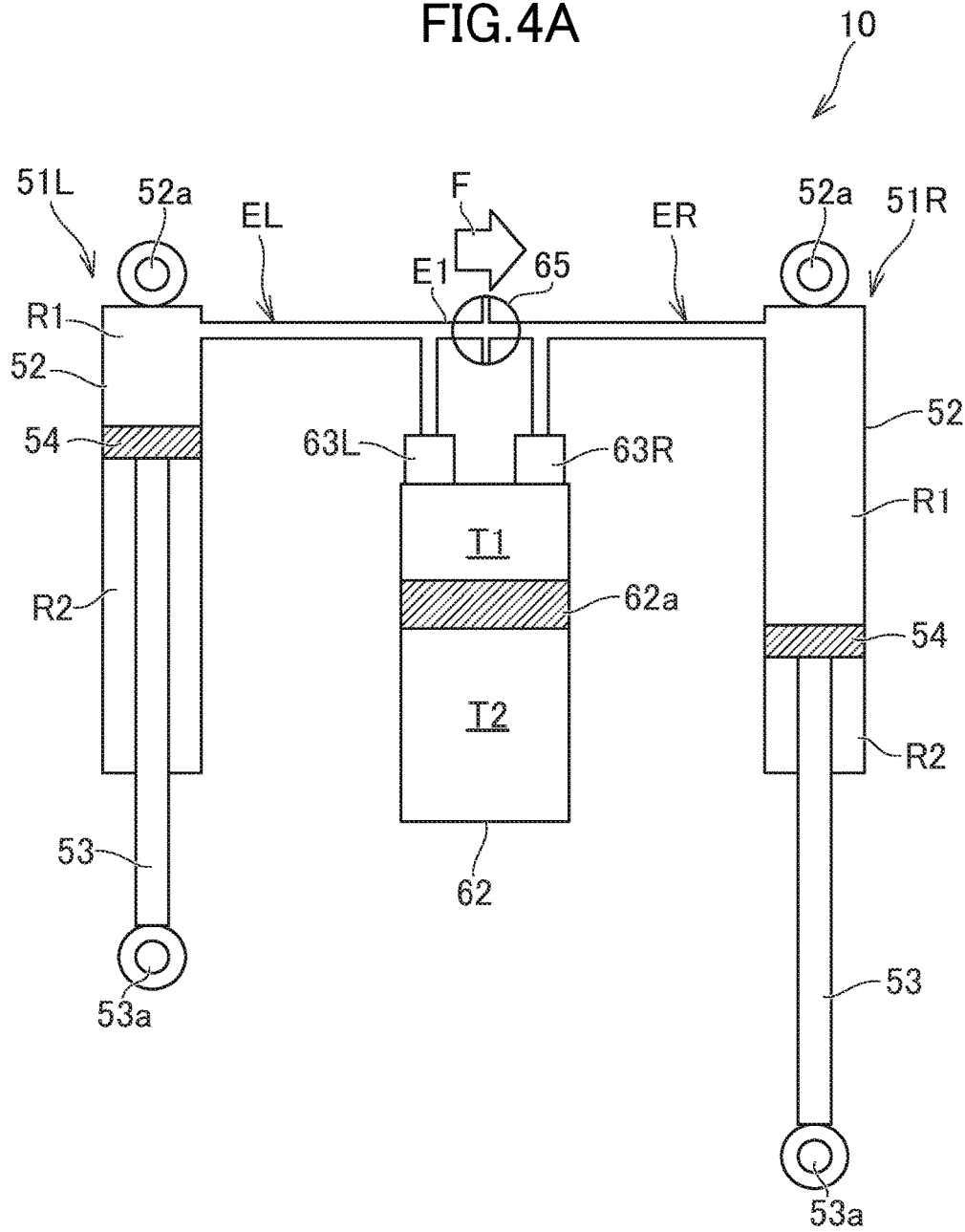
FIG. 4A illustrates the switching valve positioned at a first position.
Figure 4B:
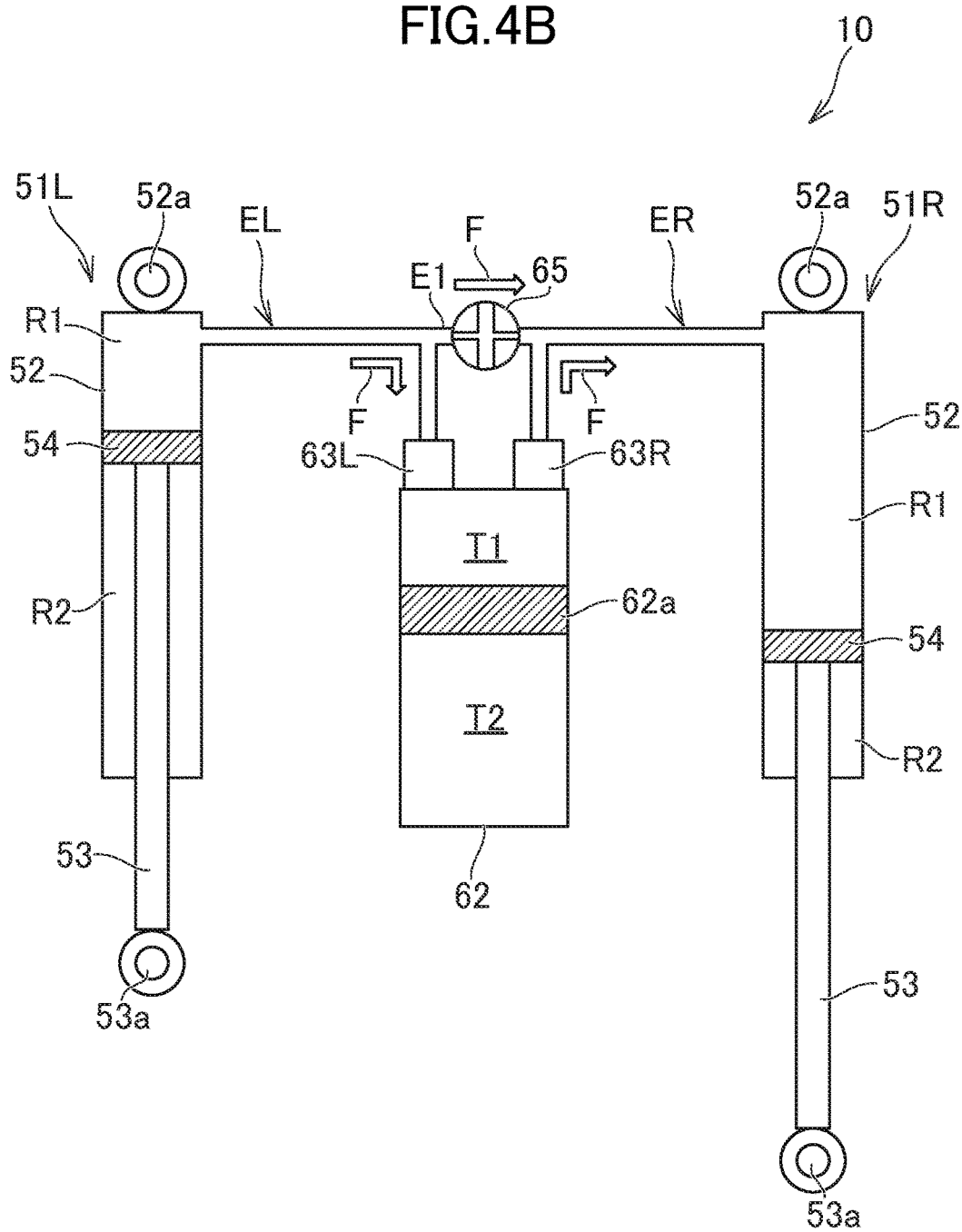
FIG. 4B illustrates the switching valve positioned at a second position.
Figure 4C:
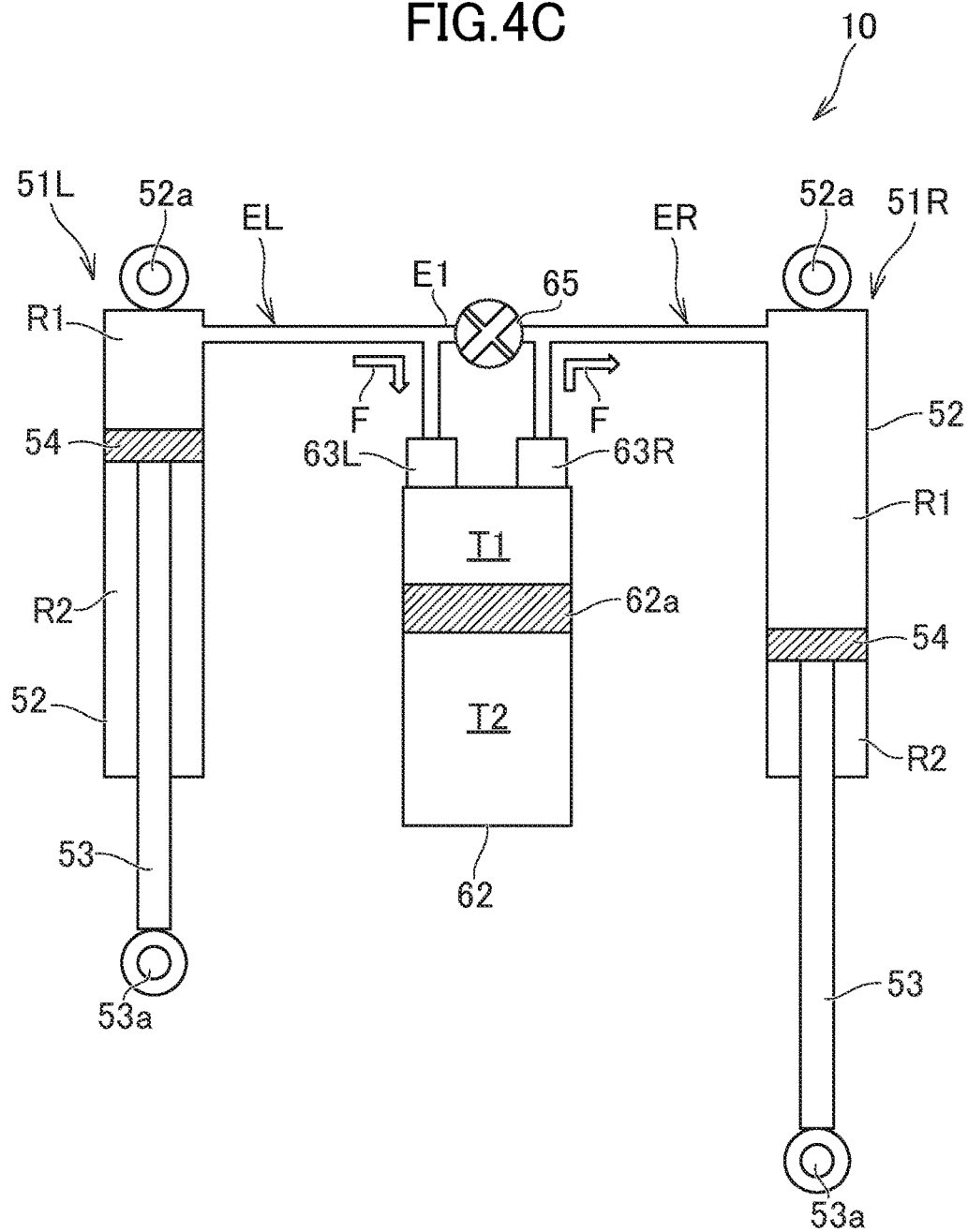
FIG. 4C illustrates the switching valve positioned at a third position.
Figure 5A:
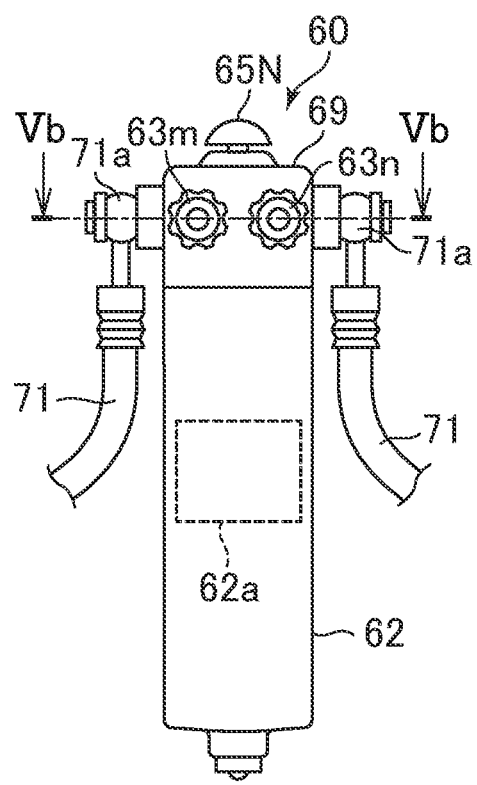
FIG. 5A shows one example of an external, appearance of a middle unit.
Figure 5B:
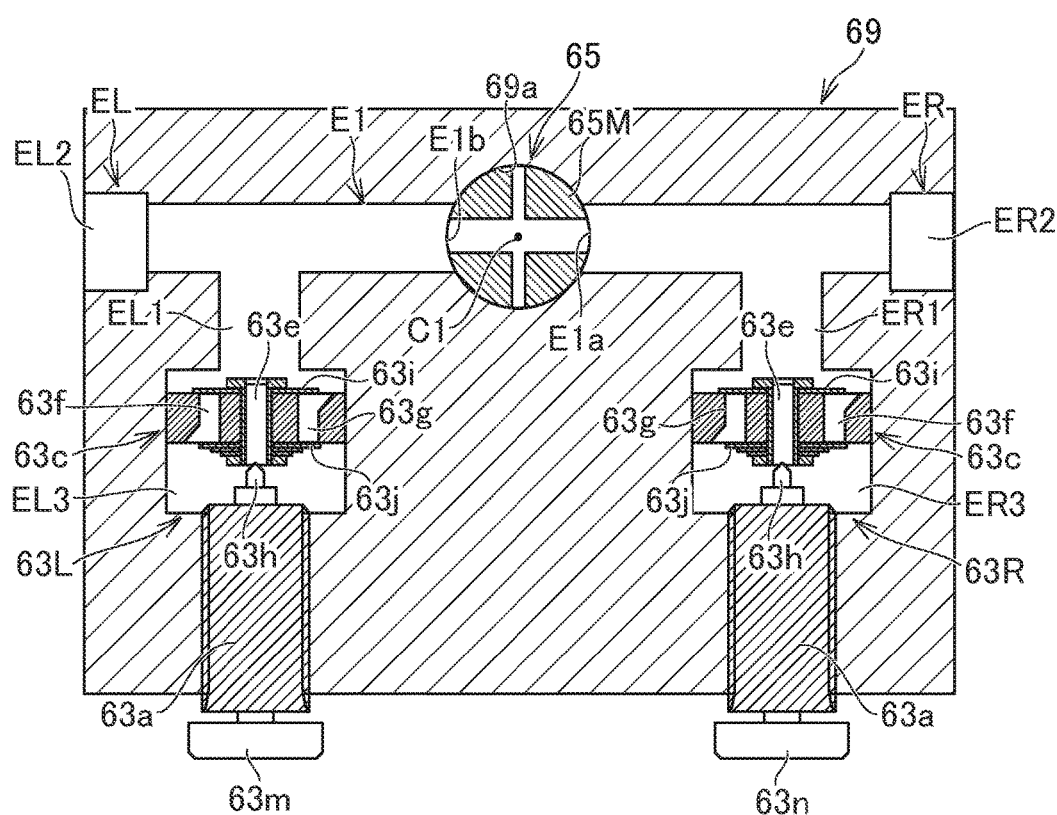
FIG. 5B is a cross sectional view along the line Vb-Vb in FIG. 5A.

The present invention will now be described by referencing the appended figures representing embodiments. FIG. 1 shows a damping system 10 that is one example of various embodiments disclosed herein. FIG. 2 is a cross sectional view showing an example of a left damper 51L of the damping system 10. FIGS. 3A, 3B, 3C illustrate a switching valve 65 to be described later. FIG. 4A illustrates a state in which the switching valve 65 is positioned at a first position. FIG. 4B illustrates a state in which the switching valve 65 is positioned at a second position. FIG. 4C illustrates a state in which the switching valve 65 is positioned at a third position. FIG. 5A shows an example of an external appearance of a middle unit. FIG. 5B is a cross sectional view along the line Vb-Vb in FIG. 5A.

The damping system 10 is mounted on a vehicle such as a snowmobile, a four-wheeled vehicle, etc. A four-wheeled vehicle includes, for example, an automobile, an All Terrain Vehicle (ATV), a recreational off-highway Vehicle (ROV), a golf cart, etc.

[Damper]

As shown in FIG. 1, the damping system 10 includes two dampers 51R, 51L. The damper 51R is mounted, for example, on the right side of a vehicle body, for damping vertical movement of a ski or a wheel mounted on the right side (the member, such as a ski, a wheel, etc., that is in contact with a snow surface or a road surface to support the vehicle body will be hereinafter referred to as a "vehicle body support member"). Meanwhile, the damper 51L is mounted, for example, on the left side of the vehicle body, for damping vertical movement of a vehicle body support member on the left side of the vehicle body. When the damping system 10 is mounted on a four-wheeled vehicle, one of the two dampers may be mounted to a front wheel to damp vertical movement thereof, while the other may be mounted for a rear wheel to damp vertical movement thereof. In the description below, the damper 51R will be referred to as a right damper, and the damper 51L as a left damper.

As shown in FIG. 2, the left damper 51L includes a cylinder 52 and a piston rod 53. The cylinder 52 includes an oil chamber R filled with oil. The piston rod 53 includes a piston 54 at an end thereof and disposed inside the oil chamber R. The piston 54 divides the oil chamber R into a first oil chamber R1 and a second oil chamber R2. The piston 54 has orifices 54a, 54b formed therein through which oil moves between the first oil chamber R1 and the second oil chamber R2. The piston 54 further includes a check valve 54c for closing the orifice 54a when the piston 54 moves downward and a check valve 54c for closing the orifice 54b when the piston 54 moves upward.

As shown in FIG. 2, the cylinder 52 includes a cap 52c at an end thereof for closing the oil chamber R. The piston rod 53 extends from the piston 54 through the second oil chamber R2 to the cap 52c to further project from the cap 52c to the outside of the cylinder 52. A vehicle, such as a snowmobile, a four-wheeled vehicle, etc., includes an arm that connects the vehicle body support member and the vehicle body frame to allow the vehicle body support member to move in the vertical direction relative to the vehicle body frame. In one example of a vehicle, an end portion 53a of the piston rod 53 is connected to the arm, and the upper end portion 52a (the end portion of the cylinder 52) of the left damper 51L is connected to the vehicle body frame. Therefore, the piston 54 moves inside the cylinder 52, following the vertical movement of the left vehicle body support member.

As shown in FIG. 2, a spring seat 52d is fixed on the outside the cylinder 52, and a spring seat 53d is fixed to the piston rod 53. A spring 59 is held between the spring seat 52d and the spring seat 53b. The spring 59 and the left damper 51L together constitute a left suspension 50L.

The right damper 51R includes the same structure as that of the left damper 51L. That is, the right damper 51R includes a cylinder 52, a piston rod 53, and a piston 54. The piston 54 moves inside the cylinder 52 of the right damper 51R, following vertical movement of the right vehicle body support member. A spring 59 mounted on the right damper 51R is held between the spring seat 52d and the spring seat 53b. The spring 59 and the right damper 51R together constitute a right suspension 50R (see FIG. 10B).

[Oil Channel]

As shown in FIG. 1, the damping system 10 includes an oil channel that connects the cylinder 52 of the right damper SIR and the cylinder 52 of the left damper 51L, and allows oil to move between the cylinder 52 of the damper 51R and the cylinder 52 of the left damper 51L. The oil channel connects the first oil chamber R1 of the right damper 51R and the first oil chamber R1 of the left damper 51L.

As shown in FIG. 1, the damping system 10 includes a middle unit 60 in the oil channel that connects the right damper 51R and the left damper 51L. The middle unit 60 includes a middle cylinder 62. The middle cylinder 62 includes an oil chamber T1 and a gas chamber T2 formed inside thereof. The oil chamber T1 and the gas chamber T2 are separated from each other by a free piston 62a that is movable along the axial line of the middle cylinder 62. The oil channel includes an oil channel ER that connects the right damper 51R and the oil chamber T1 of the middle cylinder 62, and an oil channel EL that connects the left damper 51L and the oil chamber T1 of the middle cylinder fed (the oil channel ER will be hereinafter referred to as a "right oil channel", and the oil channel EL will be hereinafter referred to as a "left oil channel"). A pipe 71 made of rubber or resin (see FIG. 2) is used as the right oil channel ER and the left oil channel EL. As shown in FIG. 2, the cylinder 52 includes a cylindrical member 52e and a cap 52f attached on and thereby closing the upper end of the cylindrical member 52e. The cap 52f has a channel formed therein to which the pipe 71 is connected.

When the two dampers 51R, 51L move in the same direction, for example, when the right vehicle body support member and the left vehicle body support member run over a bump on a snow surface or a road surface and the two dampers 51R, 51L thus contract together, oil moves from the two dampers 51R, 51L through the respective oil channels ER, EL to the middle cylinder 62. As a result, the oil chamber T1 of the middle cylinder 62 expands. Meanwhile, when the two dampers 51R, 51L move in mutually opposite directions, for example, when the vehicle turns right and thus the left damper 51L contracts, oil moves from the left damper 51L through the oil channel EL to the middle cylinder 62 and moves from the middle cylinder 62 through the oil channel BR to the right damper 51R. As a result, the right damper 51R expands, which ensures pressure contact between the right vehicle body support member and a snow surface or a road surface.

[Throttle]

As shown in FIG. 1, in an example of the damping system 10, the oil channel includes throttles 63R, 63L. The "throttle" is a part which generates resistance against an oil flow. That is, "throttle" is a part that generates a damping force. For example, a narrowed path of oil flow constitutes the throttle. The throttle 63R is disposed on the right oil channel ER connecting the middle cylinder 62 and the right damper SIR, and generates resistance against movement of oil between the right damper 51R and the middle cylinder 62. Meanwhile, the throttle 63L is disposed on the left oil channel EL connecting the middle cylinder 62 and the left damper 51L, and generates resistance against movement of oil between the left damper 51L and the middle cylinder 62. Resistance due to the throttles 63R and 63L generate a damping force for reducing vertical movement of the vehicle body support member, such as a ski or a wheel. Note that a variable throttle that is adjustable in throttle degree (in other words, amount of oil flowing) may be used as the throttle 63R, 63L.

In the example of the damping system 10, the throttles 63R, 63L are included in the middle unit 60. More specifically, the throttles 63R, 63L are included in a valve housing unit 63 (see FIG. 5) to be described later, which constitutes the middle unit 60. Alternatively, the throttles 63R, 63L may be located separately from the middle unit 60. For example, the throttles 63E, 63L may be located in a midway section of the pipe 71 that constitutes the oil channel (see FIG. 2).

The throttle 63R may generate a relatively large resistance against oil movement from the right damper 51R to the middle cylinder 62, and may generate relatively small resistance against oil movement in the opposite direction. Specifically, as will be described later in detail, the throttle 63R may have a first communication channel that generates a relatively large resistance against oil flow, and a second communication channel that generates a relatively small resistance. Similarly, the throttle 63L may generate a relatively large resistance against oil movement from the left damper 51L to the middle cylinder 62 and may generate a relatively small 11 resistance against oil movement in the opposite direction. Unlike this example, the throttle 63R, 63L may generate a relatively large resistance against oil movement from the middle cylinder 62 to the damper 51R, 51L and may generate a relatively small resistance against oil movement in the opposite direction.

[Bypass Channel and Switching Valve]

As shown in FIG. 1, the oil channel includes a bypass channel E1 that connects the right oil channel EE and the left oil channel EL. The bypass channel E1 connects the right oil channel ER and the left oil channel EL without going through the middle cylinder 62 and the throttles 63R, 63L. The bypass channel E1 includes a switching valve 65. The switching valve 65 allows or restricts oil moving in the bypass channel E1. When the switching valve 65 is in the open state, oil is allowed to move between the right damper 51R and the left damper 51L without going through the middle cylinder 62 and the throttles 63R, 63L.

As shown in FIGS. 3A, 3B, 3C, the switching valve 65 includes a valve main body 65M. The valve main body 65M is placed inside the valve housing unit 69, and is rotatable. The valve main body 65M has a first switching channel 65a formed therein for connecting the right oil channel ER and the left oil channel EL. The valve main body 65M is rotatable to a first position (the position indicated in FIG. 3A) where the first switching channel 65a connects the right oil channel ER and the left oil channel EL and to a second position different from the first position.

In the example of the damping system 10, the first switching channel 65a and a second switching channel 65b are formed in the valve main body 65M. As shown in FIG. 3B, when the valve main body 65M is at the second position, the second switching channel 65b connects the right oil channel ER and the left oil channel EL. In other words, when the valve main body 65M is at the second position, the bypass channel E1 connects the right oil channel ER and the left oil channel EL via the second switching channel 65b. In the example of the damping system 10, the second switching channel 65b is a channel that generates larger resistance against oil flow than the first switching channel 65a. For example, the second switching channel 65b is a channel having a smaller channel cross section (a smaller thickness of the channel) than the first switching channel 65a.

In the example of the damping system 10, the first switching channel 65a intersects the second switching channel 65b. Also, the first switching channel 65a and the second switching channel 65b extend in respective directions orthogonal to the rotation center line C1 of the valve main body 65M. The first switching channel 65a includes two open ends on the outer circumferential surface of the valve main body 65M. The second switching channel 65b includes two open ends on the outer circumferential surface of the valve main body 65M. A port E1a is formed on the valve housing unit 69 and is connected to the right oil channel ER. Further, a port E1b is formed on the valve housing unit 69 and is connected to the left oil channel EL.

As shown in FIG. 3A, when the valve main body 65M is disposed at the first position, the two open ends of the first switching channel 65a are connected to the respective ports E1a, E1b. As a result, the first switching channel 65a is defined in a midway section of the bypass channel E1. In the above situation, the two open ends of the second switching channel 65b are displaced from the positions of the respective ports E1a, E1b.

As shown in FIG. 3B, when the valve main body 65M is disposed at the second position, the two respective open ends of the second switching channel 65b are connected to the respective ports E1a, E1b. As a result, the second switching channel 65b is defined in a midway section of the bypass channel E1. The two open ends of the first switching channel 65a are displaced from the respective positions of the ports E1a, E1b.

In the example of the damping system 10, the valve main body 65M is rotatable to the first position, the second position, and the third position. As shown in FIG. 3C, the switching valve 65 is disposed at the third position, the switching valve 65 disconnects the right oil channel ER and the left oil channel EL from each other. That is, when the valve main body 65M is disposed at the third position, the two open ends of the first switching channel 65a and the two open ends of the second switching channel 65b are displaced from the respective positions of the ports E1a, E1b.

[Operation of Damping System]

When the vehicle turns, oil moves from the outside damper to the inside damper through the oil channel. For example, when the vehicle turns right, oil moves from the left damper 51L to the right damper 51R. For example, when the vehicle turns right with the valve main body 65M at the first position, the majority of oil moves from the left damper 51L to the right damper 51R through the bypass channel fill without going through the middle cylinder 62 and the throttles 63R, 63L (the oil flow is indicated by the arrow F in FIG. 4A), as shown in FIG. 4A. Therefore, the right damper 51R expands smoothly. As a result, contact pressure can be increased between the right vehicle body support member and a snow surface or a road surface.

When the valve main body 65M is disposed at the second position as well, oil can move between the two dampers 51R, 51L through the bypass channel fill without going through the middle cylinder 62 and the throttles 63R, 63L. However, resistance of the second switching channel 65b against the oil flow is larger than that of the first switching channel 65a. Therefore, for example, when the vehicle turns right with the valve main body 65M at the second position, an increased amount of oil moves through the throttles 63L, 63R (the oil flow is indicated by the arrow F in FIG. 4B as well), as shown in FIG. 4B, compared to a case in which the valve main body 65M is disposed at the first position. As a result, it is possible to obtain a larger damping force, compared to a case in which the valve main body 65M is set at the first position. In other words, it is possible to reduce the damping force obtained when the valve main body 65M is at the first position.

As shown in FIG. 4C, when the valve main body 65M is disposed at the third position, no oil moves through the bypass channel E1. That is, oil that moves from the left damper 51L to the right damper 51R when the vehicle turns right, for example, all passes through the throttles 63L, 63R (the oil flow is indicated by the arrow F in FIG. 4C as well). Therefore, it is possible to obtain a much larger damping force when the valve main body 65M is at the third position, compared to a case in which the valve main body 65M is at the second position.

Note that when the right damper 51R and the left damper 51L contract at the same time, that is, for example, when the right vehicle body support member and the left vehicle body support member run at the same time on a bump on a snow surface or a road surface, oil that flows from the right damper 51R to the middle cylinder 62 all passes through the throttle 63R, and oil that flows from the left damper 51L to the middle cylinder 62 ail passes through the throttle 63L, irrespective of the position of the valve main body 65. With the above, it is possible to obtain a large damping force.

According to the damping system 10 including the above described rotatable switching valve 65, it is possible to adjust the amount of oil flowing in the oil channel by performing a simple operation. That is, an operator can adjust the amount of oil moving through the bypass channel E1 by rotating the valve main body 65M. Further, since two switching channels 65a, 65b are formed in the valve main body 65M, it is possible to achieve a state in which oil smoothly moves between the two dampers 51R, 51L (the valve main body 65M at the first position), a state in which the bypass channel E1 is blocked (the valve main body 65M at the third position), and a state between the above two states (the valve main body 65M at the second position).

[Middle Unit]

As shown in FIG. 5A, in the example of the damping system 10, the middle unit 60 includes the above described middle cylinder 62 and the valve housing unit 59 fixed on the middle cylinder 62. The valve housing unit 69 houses the throttles 63R, 63L and the switching valve 65. The valve housing unit 69 is fixed on the upper part of the middle cylinder 62, for example.

In the example of the damping system 10, the right oil channel ER includes the pipe 71 extending from the right damper 51R, while the left oil channel includes the pipe 71 extending from the left damper 51L. A nipple 71a is attached on an end portion of the pipe 71, and connected to the valve housing unit 69. As shown in FIG. 5B, the above described bypass channel E1 is formed inside the valve housing unit 69, A valve storage 69a is formed in a midway section of the bypass channel E1. The valve main body 65M of the switching valve 65 is placed in the valve storage 69a. The valve main body 65M is shaped like a column, and arranged such that the center line thereof extends along the rotation center line C1 of the valve main body 65M. Each of the valve storage 69a and the valve main body 65M may have a stopper for limiting the rotation angle of the valve main body 65M. In other words, each of the valve storage 69a and the valve main body 65M may have a stopper for limiting the movable range of the valve main body 65M to the range between the first and second positions. In this case, the third position may be defined between the first and second positions.

As shown in FIG. 5A, the switching valve 65 includes a valve operation member 65N for operating the valve main body 65M. The valve operation member 65N is rotatable integrally with the valve main body 65M. In the example of the damping system 10, the rotation center line C1 of the valve main body 65M and the valve operation member 65M is substantially in parallel to the axial direction of the middle cylinder 62 (in other words, the movement direction of the free piston 62a), and substantially orthogonal to the rotation center line of a movable member 63a of each of the throttles 63R, 63L to be described later. A layout of the valve main body 65M and the valve operation member 65N is not limited to the example of the middle unit 60. That is, the rotation center line C1 of the valve main body 65M and the valve operation member 65N may not be in parallel to the movement direction of the free piston 62a or orthogonal to the rotation center line of the movable member 63a of the throttle 63R, 63L. The valve operation member 65N is disposed outside the valve housing unit 69. For example, the valve operation member 65N is disposed on the top surface of the valve housing unit 69. As another example, the valve operation member 65N may be disposed on the front surface or a side surface of the valve housing unit 69. As still another example, the bypass channel E1 may be formed separately from the middle unit 60. For example, the bypass channel E1 may be a pipe made of resin, such as rubber. In this case, the switching valve 65 may be arranged in a midway section of this pipe.

As shown in FIG. 5B, the valve housing unit 69 has the channels ER1, EL1 formed inside the valve housing unit 69. The channels ER1, EL1 extend to the respective throttles 63R, 63L from the respective connection ports ER2, EL2 to which the end portions of the respective pipes 71 are connected. The channel ER1 is connected to one end portion of the bypass channel E1, while the channel EL1 is connected to the other end portion of the bypass channel E1.

As shown in FIG. 5B, in the example of the middle unit 60, each of the throttles 63R, 63L includes a movable member 63a, a first check valve 63i, a second check valve 63j, and a channel member 63c. The channel member 63c has a variable communication channel 63e, a first communication channel 63f, and a second communication channel 63g formed therein. Oil chambers ER3, EL3 are formed in the valve housing unit 69 and is each connected to the oil chamber T1 of the above describe middle cylinder 62. The channel member 63c is placed in the oil chamber ER3, EL3. The oil chamber ER3 of the throttle 63R is connected to the channel ER1 through the communication channels 63e, 63f, 63g. Similarly, the oil chamber EL3 of the throttle 63L is connected to the channel EL1 through the communication channels 63e, 63f, 63g. The movable member 63a includes a needle 63h which can be inserted into the variable communication channel 63e, and is rotatable. When the movable member 63a rotates in one direction, the needle 63h moves to be inserted into the variable communication channel 63e, whereby the movable member 63a closes the variable communication channel 63e. Meanwhile, when the movable member 63a rotates in the opposite direction, the needle 63h moves to be removed from the variable communication channel 63e, whereby the movable member 63a opens the variable communication channel 63e. That is, the opening degree of the variable communication channel 63e depends on the position of the needle 63h; in other words, depends on the rotation position of the movable member 63a. The first check valve 63i is arranged so as to close the first communication channel 63f, while the second check valve 63j is arranged so as to close the second communication channel 63g. When oil flows from the channel ER1, EL1 toward the oil chamber ER3, EL3, that is, from the damper 51R, 51L to the middle cylinder 62, the first check valve 63i closes the first communication channel 63f and the second check valve 63j is opened. Meanwhile, when oil flows in the opposite direction, that is, from the middle cylinder 62 toward the damper 51R, 51L, the second check valve 63j closes the second communication channel 63g and the first check valve 63i is opened. The valve opening pressure of the first check valve 63i is sufficiently smaller than that of the second check valve 63j (note that "valve opening pressure" refers to a pressure of oil necessary for the check valve to be opened). With this structure of the throttle 63R, 63L, the second check valve 63j generates relatively large resistance (that is, relatively large damping force) against oil movement from the damper 51R, 51L to the middle cylinder 62, and the first check valve 63i generates relatively small resistance (that is, a relatively small damping force) against oil movement from the middle cylinder 62 to the damper 51R, 51L. When the needle 63h holds the variable communication channel 63e open, oil can pass through the variable communication channel 63e as well. Therefore, resistance against oil movement can foe adjusted by changing the position of the needle 63h.

When a vehicle roils repeatedly with the bypass channel E1 closed by the switching valve 65, oil alternately moves between the left damper 51L and the right damper 51R through the middle cylinder 62. In the above, the sum of the damping forces achieved by the check valves 63i, 63j of the throttle 63R and those by the check valves 63i, 63j of the throttle 63L makes the total damping force.

When the vehicle moves up and down with the bypass channel E1 closed by the switching valve 65, oil moves from the respective dampers 51R, 51L to the middle cylinder 62 during a compression process of the dampers 51R, 51L. With the above, in the compression process, damping force is obtained by the second check valves 63j of the respective throttles 63R, 63L. Meanwhile, in the expansion process of the dampers 51R, 51L, oil moves from the middle cylinder 62 to the respective dampers 51R, 51L. In the expansion process, damping force is obtained by the first check valves 63i of the respective throttles 63R, 63L. That is, when the vehicle moves up and down, damping force by the second check valves 63j of the respective throttles 63R, 63L and that of the first check valves 63i of the respective throttles 63R, 63L can be alternately obtained.

Therefore, in the example of the damping system 10, the total of damping force by the throttles 63R, 63L is the same between when the vehicle rolls repeatedly and when the vehicle moves up and down.

Operation members 63m, 63n for operating the respective throttles 63R, 63L are disposed outside the valve housing unit 69. A user can adjust the throttling degree of the throttle 63R, 63L, using the operation member 63m, 63n. For example, the operation members 63m, 63n are disposed on the front surface of the valve housing unit 69. As another example, the operation members 63m, 63n may be disposed on the top surface or a side surface of the valve housing unit 69.

A structure of the throttle 63R, 63L is not limited to the example shown in FIGS. 5A and 5B. For example, the throttle 63R, 63L may not be a variable throttle. That is, the throttle 63R, 63L may be a valve with a fixed throttling degree (in other words, resistance against oil flow). In this case, the middle unit 60 may not include the operation members 63m, 63n and the movable member 63a. In another example, the channel member 63c may not include the first check valve 63i. In this case as well, the resistance against the oil flow from the middle cylinder 62 to the damper 51R, 51L results in a lower resistance than the resistance against the oil flow in the opposite direction. In yet another example, an orifice that generates resistance against the oil flow may be provided in the channel member 63c, instead of the communication channels 63e, 631, 63j. As yet another example, the throttles 63R, 63L may not be provided to the middle unit 60, but may be provided to the pipes 71 on the right and left respective sides.

[Modified Example of Damping System]

Figure 6:
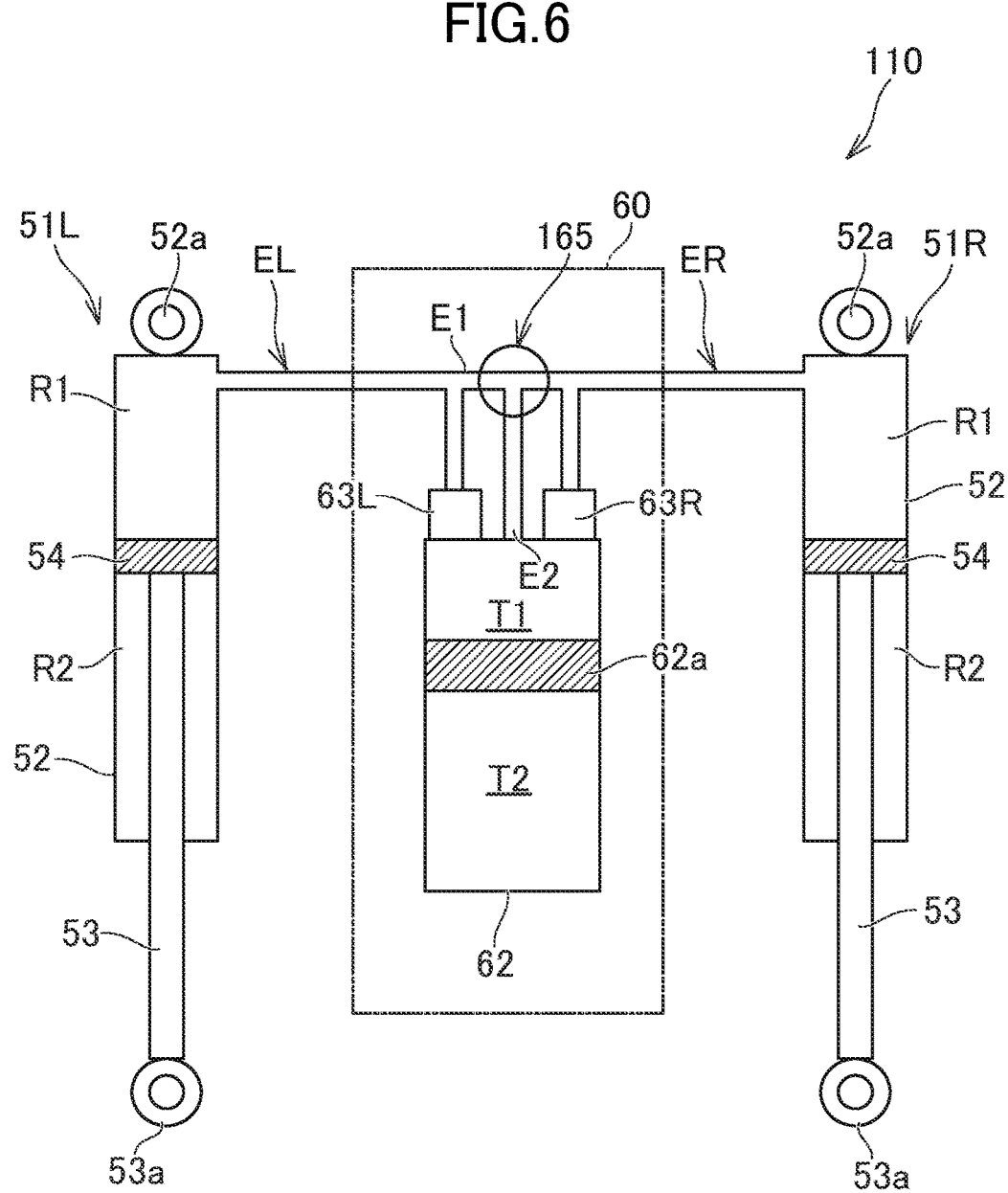
FIG. 6 shows a modified example of the damping system.
Figure 7A:
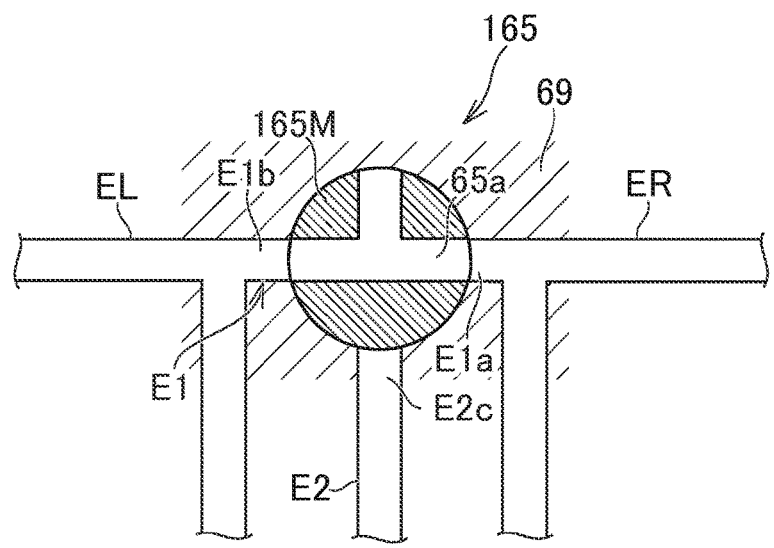
FIG. 7A illustrates a switching valve provided to the damping system shown in FIG. 6, wherein the switching valve is positioned at a first position.
Figure 8:
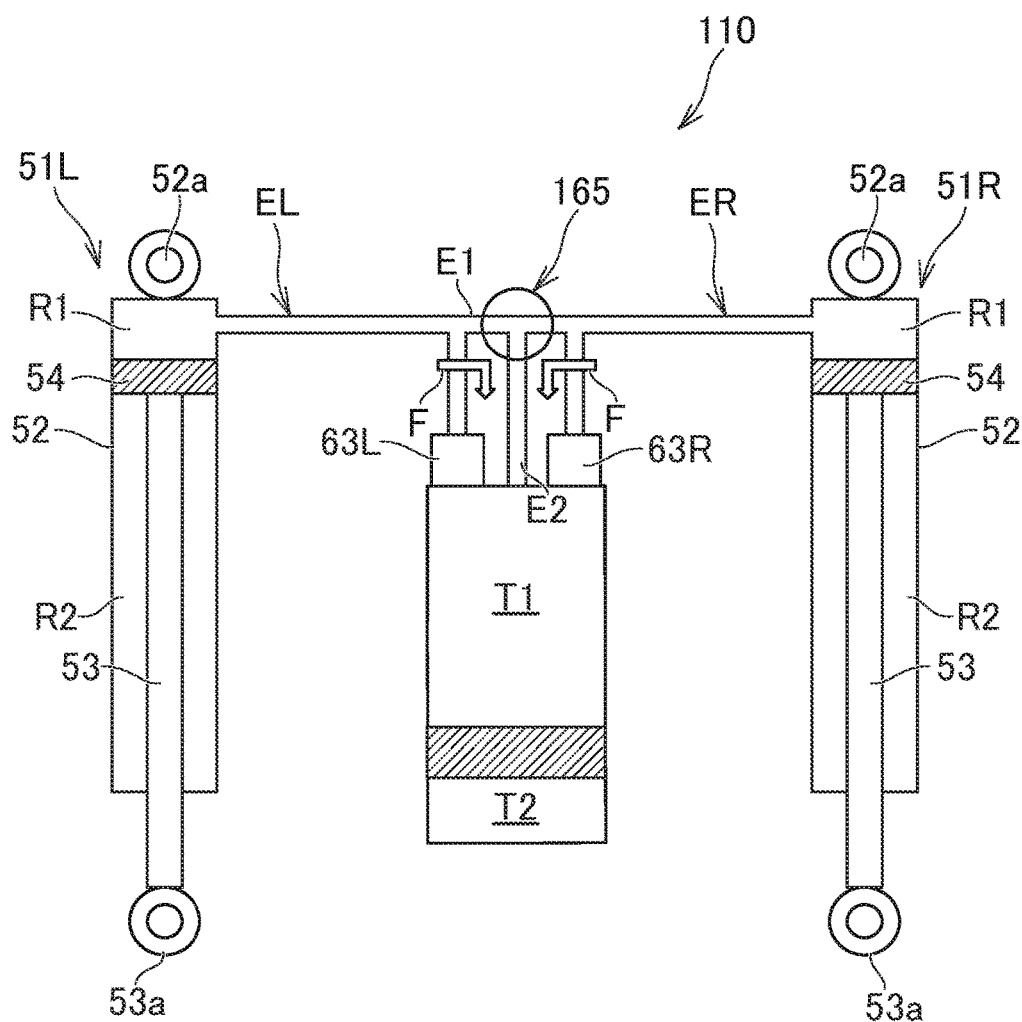
FIG. 8 illustrates the switching valve shown in FIGS. 6 and 7 positioned at the second position.

FIGS. 6, 7A, and 8 illustrate an embodiment of damping system 110 that is a modified example of the damping system 10. In these drawings, a member identical to one that has been described above is given the same reference numeral. In the following, a difference from the damping system 10 will be described. Items not described with respect to the damping system 110 are similar to those of the damping system 10.

[Bypass Channel]

As shown in FIG. 6, the damping system 110 includes a switching valve 165. In addition, the damping system 110 includes a bypass channel E2 for connecting the right oil channel BR and the left oil channel EL to the middle cylinder 62 without going through the throttles 63R, 63L. In the example of the damping system 110, the bypass channel E2 is formed so as to connect the switching valve 165 and the middle cylinder 62 to each other (the bypass channel E1 will be hereinafter referred to as a "first bypass channel" and the bypass channel E2 as a "second bypass channel").

[Switching Valve]

Figure 7B:
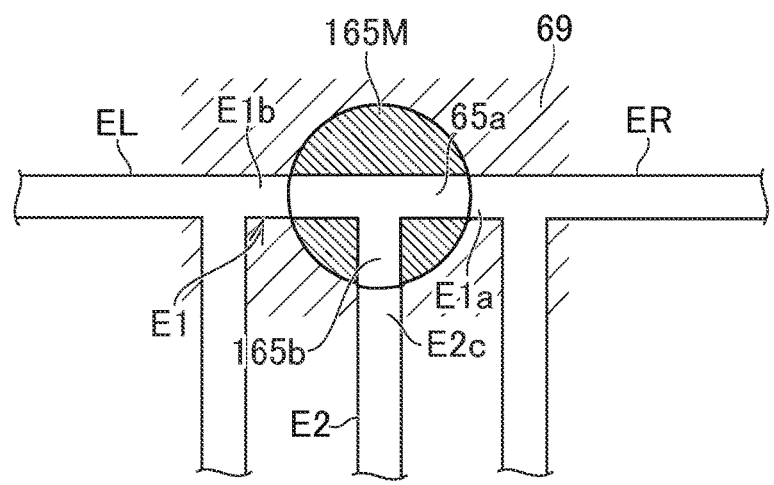
FIG. 7B illustrates the switching valve provided to the damping system shown in FIG. 6, wherein the switching valve is positioned at a second position.
Figure 7C:
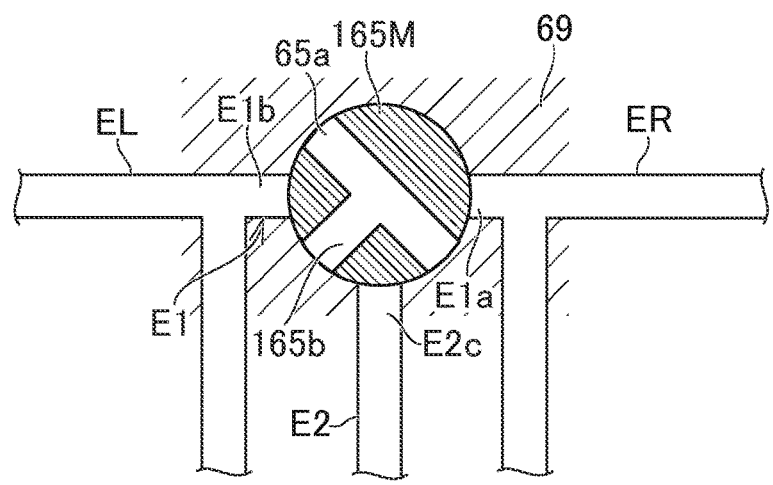
FIG. 7C illustrates a switching valve provided to the damping system shown in FIG. 6, wherein the switching valve is positioned at a third position.

As shown in FIGS. 7A, 7B, 7C, the switching valve 165 includes a valve main body 165M. The valve main body 165M is placed inside the valve housing unit 69, and is rotatable. The valve main body 165M has a first switching channel 65a formed therein for connecting the right oil channel ER and the left oil channel EL. Similar to the above described valve main body 65M, the valve main body 165M as well is rotatable to the first position the position shown in FIG. 7A) where the first switching channel 65a connects the right oil channel ER and the left oil channel EL, and to the second position, which is differ exit from the first position.

In the example of the damping system 110, the first switching channel 65a and a second switching channel 165b are formed in the valve main body 165M. As shown in FIG. 7A, when the valve main body 165M is disposed at the first position, the first bypass channel E1 connects the right oil channel ER and the left oil channel EL via the first switching channel 65a. At this time, the second bypass channel E2 is not connected to the right oil channel ER and the left oil channel EL. Meanwhile, as shown in FIG. 7B, when the valve main body 165M is disposed at the second position, the second switching channel 165b connects the right oil channel ER and the left oil channel EL to the second bypass channel E2. In the example of the damping system 110, when the valve main body 165M is disposed at the second position, the right oil channel ER and the left oil channel EL are connected to the second bypass channel E2 via the first switching channel 65a and the second switching channel 165b.

As shown in FIGS. 7A, 7B, 7C, in the example of the damping system 110, the second switching channel 65b is connected to a mid-way point of the first switching channel 65a. The first switching channel 65a and the second switching channel 165b extend in respective directions orthogonal to the rotation center line of the valve main body 165M. The first switching channel 65a includes two open ends formed on the outer circumferential surface of the valve main body 165M. One end of the second switching channel 165b is connected to the first switching channel 65a, and the other end is open on the outer circumferential surface of the valve main body 165M. A port E1a connected to the right oil channel ER and a port E1b connected to the left oil channel EL are formed in the valve housing unit 69. In addition, a port E2c connected to the second bypass channel E2 is formed in the valve housing unit 69. As shown in FIG. 7A, when the valve main body 165M is disposed at the first position, the two respective open ends of the first switching channel 65a are connected to the respective ports E1a, E1b. In the above situation, the open end of the second switching channel 165b is displaced from the positions of the ports E1a, E1b, E2c. Meanwhile, as shown in FIG. 7B, when the valve main body 165M is disposed at the second position, the two respective open ends of the first switching channel 65a are connected to the respective ports E1a, E1b, and the open end of the second switching channel 165b is connected to the port E2c of the second bypass channel E2. That is, when the valve main body 165M is disposed at the second position, the right oil channel ER, the left oil channel EL, and the second bypass channel E2 are connected to one another without going through the throttles 63R, 63L.

The valve main body 165M is rotatable to the first position, the second position, and the third position. As shown in FIG. 7C, the valve main body 165M at the third position blocks the communication between the right oil channel ER, the left oil channel EL, and the second bypass channel E2. That is, when the valve main body 165M is disposed at the third position, the two open ends of the first switching channel 65a and the open end of the second switching channel 165b are displaced from the positions of the respective ports E1a, E1b, E2c.

[Operation of Damping System]

When the dampers 51R, 51L move in the same direction, that is, for example, when the right vehicle body support member and the left vehicle body support member run over a bump on a snow surface or a road surface at the same time and the dampers 51R, 51L thus contract, oil flows from the right damper 51R to the middle cylinder 62 and also from the left damper 51L to the middle cylinder 62. When the valve main body 165M is disposed at the first position and the dampers 51R, 51L move in the same direction, oil that flows from the right damper 51R toward the middle cylinder 62 all passes through the throttle 63R, and oil that flows from the left damper 51L toward the middle cylinder 62 all flows through, the throttle 63L. Therefore, it is possible to obtain a large damping force. On the contrary, when the valve main body 165M is at the second position, the right oil channel ER and the left oil channel EL are connected to the second bypass channel E2 via the first switching channel 65a and the second switching channel 165b. Therefore, when the dampers 51R, 51L then move in the same direction, oil in the right damper 51R and oil in the left damper 51L flow to the middle cylinder 62 through the first bypass channel E1 and the second bypass channel E2, as shown in FIG. 8 (the flow of oil is indicated by the arrow F in FIG. 8). As a result, the amount of oil that flows via the throttles 63R, 63L to the middle cylinder 62 decreases, which makes the damping force smaller than that obtained with the valve main body 165M at the first position.

As described above, when a vehicle turns, oil moves from an outside damper to an inside damper through the oil channel. For example, when the vehicle turns right, oil moves from the left damper 51L to the right damper 51R. When the vehicle turns right with the valve main body 165M at the first position, for example, the majority of oil moves from the left damper 51L to the right damper 51R through the first bypass channel E1 without going through the middle cylinder 62 and the throttles 63R, 63L, similar to the state shown in FIG. 4A. Therefore, the right damper 51R expands smoothly, and contact pressure can be increased between the right vehicle body support member and a snow surface or a road surface. When the valve main body 165M is at the second position as well, the first bypass channel E1 connects the right oil channel ER and the left oil channel EL via the first switching channel 65a. Therefore, when the vehicle turns right with the valve main body 165M at the second position, for example, the majority of oil moves from the left damper 51L to the right damper 51R through the first bypass channel E1, similar to the state shown in FIG. 4A. That is, when the two dampers 51R, 51L move in mutually opposite directions and also when the two dampers 51R, 51L move in the same direction, the valve main body 165M at the second position allows the oil to avoid flowing through the throttles 63R, 63L.

Note that a cross section of the first switching channel 65a in the switching valve 165 may fee smaller than that of the first switching channel 65a in the switching valve 65, which has been described referring to FIGS. 3A, 3B, 3C, etc. That is, when the vehicle turns with the valve main body 165M set at the first position, oil may partially flow from the left damper 51L through the throttle 63L to the middle cylinder 62 and further from the middle cylinder 62 to the right damper 51R through the throttle 63R similar to the state shown in FIG. 4B.

When a vehicle turns with the valve main body 165M at the third position, no oil moves through the bypass channels E1, E2, similar to the state shown in FIG. 4C. Therefore, oil that moves from the left damper 51L to the right damper 51R when the vehicle turns right, for example, all passes through the throttles 63L, 63R. As a result, it is possible to obtain a larger damping force, compared to a case in which the valve main body 165M is at the first position or the second position. Also, when the dampers 51R, 51L move in the same direction with the valve main body 165M at the third position, oil that flows from the right damper 51R toward the middle cylinder 62 all passes through the throttle 63R, while oil that flows from the left damper 51L toward the middle cylinder 62 all passes through the throttle 63L. Therefore, it is possible to obtain a larger damping force, compared to a case in which the valve main body 165M is set at the second position.

According to the damping system 110 including the rotatable switching valve 165, it is possible to adjust oil flow in the oil channel by performing a simple operation. That, is, an operator can adjust the amount of oil flowing through the bypass channels E1, E2 by rotating the valve main body 165M. Also, as the two switching channels 65a, 165b are formed in the valve main body 165M, three states, namely, the state in which only the first bypass channel E1 functions (FIG. 7A), the state in which the first bypass channel E1 and the second bypass channel E2 function (FIG. 7B), and the state in which neither the first bypass channel E1 nor the second bypass E2 functions (FIG. 7C), can be achieved.

Note that the valve main body 165M shown in FIGS. 7A, 7B, 7C is housed in the valve housing unit 69, similar to the middle unit 60 shown in FIG. 5. Further, the valve operation member 65N that is integrally rotatable with the valve main body 165M is mounted outside the valve housing unit 69.

Figure 9:
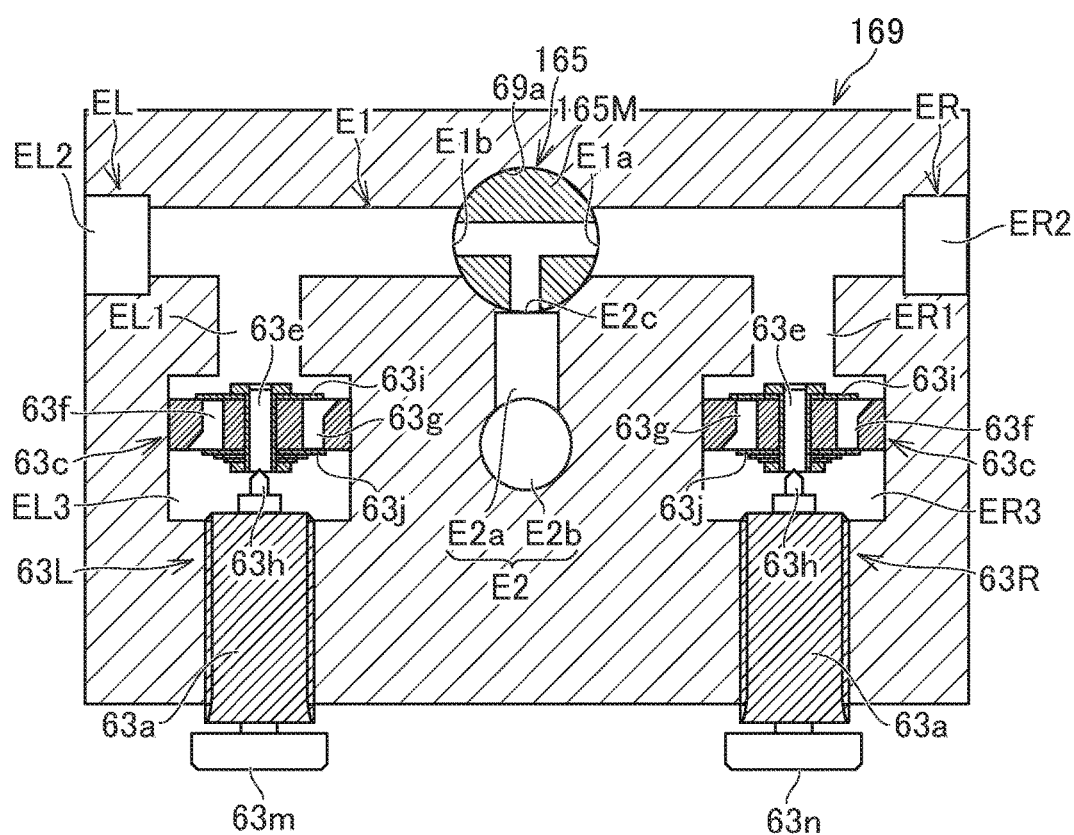
FIG. 9 is a cross sectional view showing an example of a middle unit including the switching valve shown in FIG. 6, in which the cross section shown is the same as that in FIG. 5B.

FIG. 9 is a cross sectional view showing an example of the middle unit 60 including the switching valve 165. This cross section is similar to that along the line Vb-Vb in FIG. 5A. In this drawing, members and portions similar to those already described are given the same reference numeral.

In the example shown in this drawing, the middle unit 60 includes a valve housing unit 169 where the valve storage 69a is formed. The valve main body 165M of the switching valve 165 is placed in the valve storage 69a. Different from the example shown in FIG. 5B, the second bypass channel E2 is formed in the valve housing unit 169. The second bypass channel E2 includes, for example, a channel E2a extending from the valve storage 69a in a direction orthogonal to the first bypass channel E1, and a channel E2b formed at the right angle relative to the channel E2a and extending from the channel E2a toward the middle cylinder 62. The second bypass channel E2 is formed, for example, between the channels ER1 and EL1 connected to the respective throttles 63R, 63L. The structure of the valve housing unit 169 is not limited to the example shown in FIG. 9 and may be desirably modified.

[Vehicle Including Damping System]

[Example of Snowmobile]

Figure 10A:
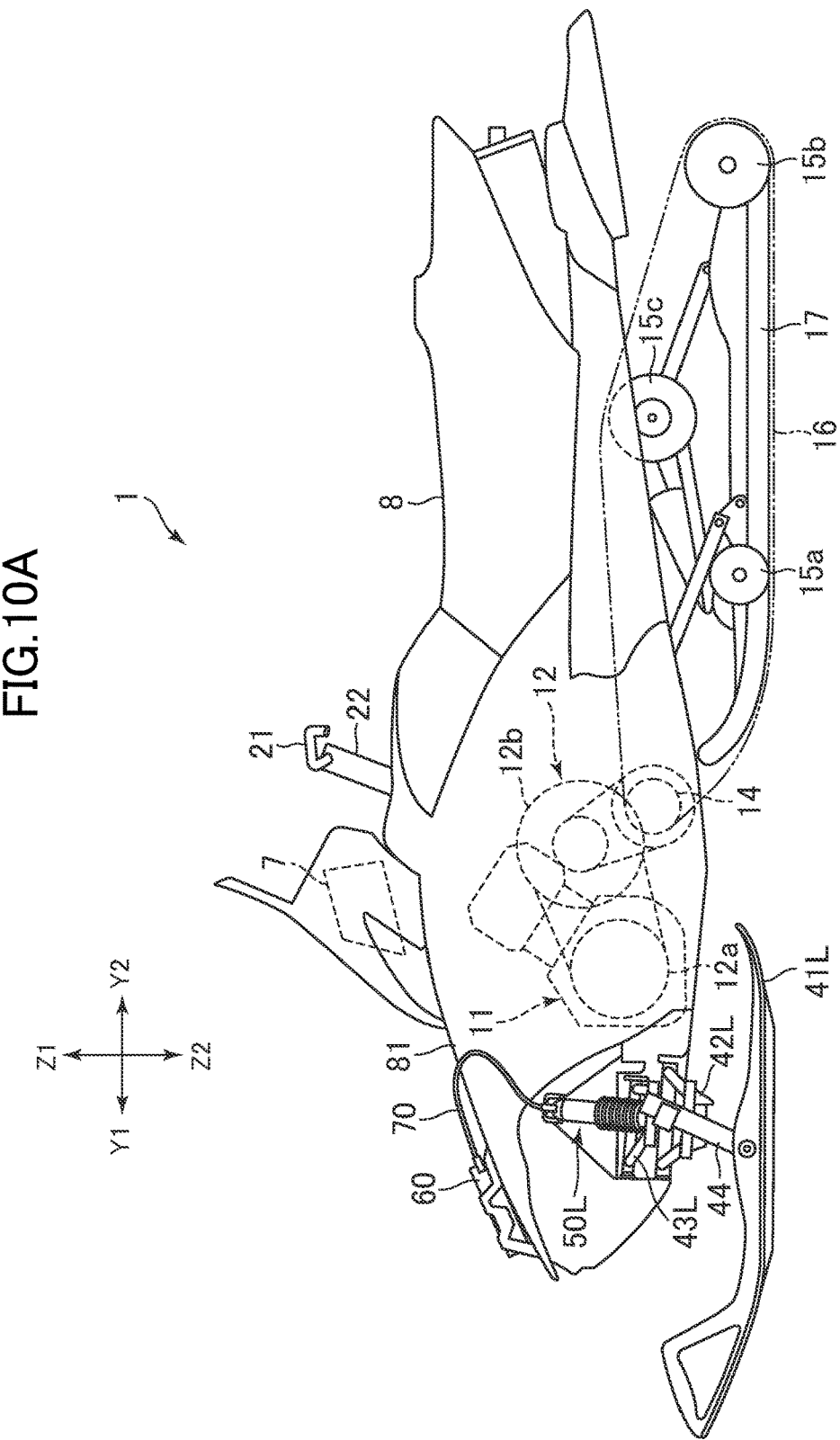
FIG. 10A is a side view of a snowmobile, that is an example of a vehicle including a damping system.

FIGS. 10A and 10B show an example of a vehicle including the damping system 10, 110 mounted thereon. Note here that as one example of the vehicle, a snowmobile 1 is shown FIG. 10A is a side view of the snowmobile 1; FIG. 10B is a front view of the snowmobile 1. In these drawings, the directions indicated by Y1 and Y2 refer to a forward direction and a rearward direction, respectively; those indicated by Z1 and Z2 as upward and downward directions, respectively; and those indicated by X1 and X2 as rightward direction and leftward direction, respectively.

As shown in FIG. 10B, the snowmobile 1 includes a right ski 41R (the vehicle body support member) for supporting the vehicle body and a left ski 41b (the vehicle body support member) for supporting the vehicle body. The right ski 41R is supported by a lower arm 42R and an upper arm 43R. Similarly, the left ski 41L is supported by a lower arm 42L and an upper arm 43L. The arms 42R, 43R on the right side include proximal portions connected to the vehicle body frame 30, extend in the rightward direction from the proximal portions, and include end portions connected to the knuckle 44. The right ski 41R is connected to the lower end of the knuckle 44. Meanwhile, the arms 42L, 43L on the left side include proximal portions connected to the vehicle body frame 30, extend in the leftward direction from the proximal portions, and include end portions connected to the knuckle 44. The left ski 41L is connected to the lower end of the knuckle 44. This structure allows the skis 41R, 41L to move up and down relative to the vehicle body frame 30.

In the example of the snowmobile 1, each of the dampers 51R, 51L is arranged such that the cylinder 52 is positioned toward the upper side thereof and the piston rod 53 is positioned toward the lower side thereof. The upper end portions 52a of the cylinders 52 of the respective dampers 51R, 51L are connected to the vehicle frame 30, while the lower end portion 53a of the piston rod 53 of the right damper 51R is connected to the lower arm 42R, and the lower end portion 53a of the piston rod 53 of the left damper 51L is connected to the lower arm 42L. The spring 59 is mounted on the damper 51R, 51L, as described above.

As shown in FIG. 10A, the snowmobile 1 includes an engine 11 and a transmission 12 as the driving system. The transmission 12 is, for example, a continuously variable transmission, and accordingly includes a drive pulley 12a for receiving torque from a crank shaft of the engine 11 and a driven pulley 12b for receiving torque from the drive pulley 12a. A belt for transmitting torque of the drive pulley 12a to the driven pulley 12b is wound around the pulleys 12a, 12b. Note that the transmission 12 may not be a continuously variable transmission, and may be, for example, a gear type including gears corresponding to a plurality of shift levels.

As shown in FIG. 10A, the snowmobile 1 includes a track belt drive shaft 14 having a sprocket hooked on the track belt 16. The track belt drive shaft 14 is linked to a secondary shaft via a belt, a chain, or the like, and receives torque of the engine 11 via the transmission 12. Guide wheels 15a, 15b, 15c and a slide rail 17 are arranged inside the track belt 16, and those guide the track belt 16. The track belt 16 is pressed onto a snow surface by the slide rail 17.

The snowmobile 1 includes a seat 8. As shown in FIG. 10A, the seat 8 is located upward from the track belt 16. A steering handle 21 for steering the skis 41R, 41L is arranged ahead of the seat 8. The steering handle 21 is fixed on the upper portion of a steering column 22. The steering column 22 extends diagonally downward and forward from a center portion of the steering handle 21. The steering handle 21 is linked to the skis 41R, 41L via the steering column 22 and a tie rod (not shown). The snowmobile 1 includes a display unit 7 for displaying a vehicle speed, an engine speed, etc. The display unit 7 is arranged ahead of the steering handle 21 and the steering column 22.

As described above, the damping system 10, 110 includes the middle unit 60. The middle unit 60 is located further forward than the steering column 22 in the side view of the vehicle body. Also, in the example of the snowmobile 1, the middle unit 60 is disposed outside an exterior member constituting an external appearance of the vehicle body. More specifically, as shown in FIG. 10B, the snowmobile 1 includes a front cover 81 provided in a front part thereof, that constitutes an external appearance of the vehicle body, and covers the vehicle frame 30 and the engine 11. The middle unit 60 is arranged on the upper side of the front cover 81. As described above, the operation members 65N, 63m, 63n (see FIG. 5) are mounted on the valve housing unit 69 of the middle unit 60. Specifically, the operation members 65N, 63m, 63n are positioned outside the exterior member. According to this layout, an operator can readily access the operation members 65N, 63m, 63n. Note that the layout of the middle unit 60 is not limited to the example of the snowmobile 1. For example, the middle unit 60 may be arranged inside the exterior member, and the operation members 65N, 63m, 63n may be covered by a cover that can be opened and closed.

Also, art actuator (for example, a stepping motor) for rotating the valve main body 65M, 165M may be provided to the middle unit 60, instead of the valve operation member 65N. Further, an operation member (for example, a button) for a driver to operate the stepping motor may be disposed in the vicinity of the steering handle 21.

As shown in FIG. 10B, the middle unit 60 is held by a holder 39. The holder 39 is attached to the front cover 81 by a fixing member such as a bolt, a screw, etc. The position where the middle unit 60 is attached is not limited to the example of the snowmobile 1. For example, the middle unit 60 may be attached on the vehicle frame 30. A structure for fixing the middle unit 60 is not limited to the example of the snowmobile 1. For example, the holder 39 may not be used in mounting the middle unit 60.

The middle unit 60 is positioned between the right damper 51R and the left damper 51L in the front view of the vehicle body. In the example of the snowmobile 1, the middle unit 60 is arranged so as to overlap the center line C1 of the vehicle body in the right-left direction. With the above, it is possible to reduce a difference in length between the pipe 71 connected to the right damper 51R and the pipe 71 connected to the left damper 51L.

[Modified Example of Snowmobile]

Figure 11:
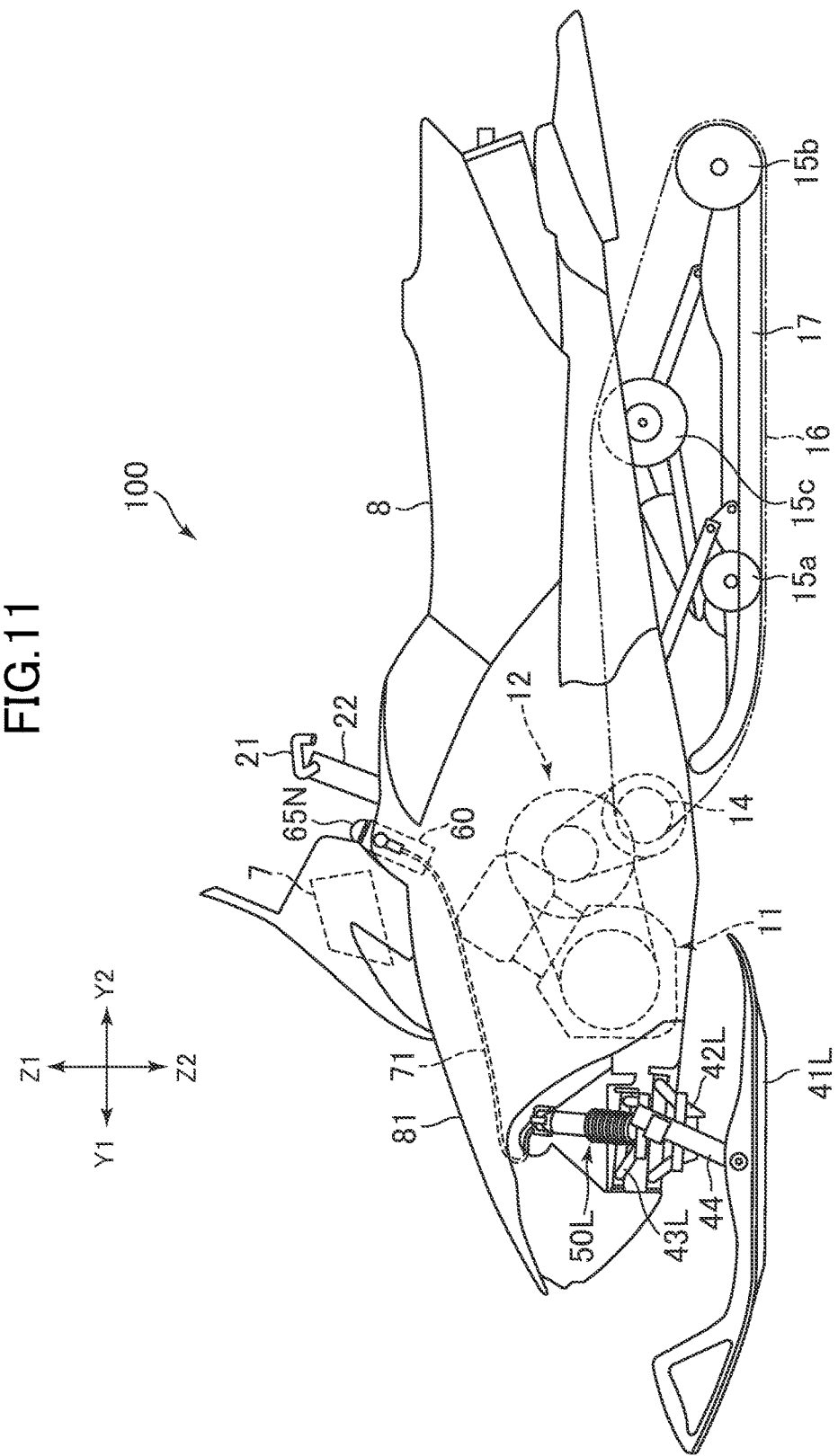
FIG. 11 shows another example of a snowmobile.

FIG. 11 is a side view showing a modified example of the snowmobile 1. In this drawing, a snowmobile 100 is shown as a modified example. In this drawing, members and portions identical to those described above are given the same reference numerals. In the following, differences from the snowmobile 1 will be described. Items not described with respect to the snowmobile 100 are similar to those with the snowmobile 1.

In the example of the snowmobile 100, the middle unit 60 is positioned ahead of the steering column 22. More specifically, the middle unit 60 is positioned between the display unit 7 and the steering column 22. According to this layout of the middle unit 60, the distance between the position of a driver sitting on the seat 8 and the middle unit 60 is shorter. As a result, the driver can readily operate the operation members 65M, 63m, 63n of the middle unit 60. In the example of the snowmobile 100, the middle unit 60 is arranged to overlap the steering column 22 in the front view of the vehicle body.

The middle unit 60 is inclined, similar to the steering column 22. Specifically, the middle unit 60 is arranged such that the axial line of the middle cylinder 62 extends in the direction in which the steering column 22 extends. With the above, it is possible to effectively utilize the relatively small space ahead of the steering column 22. The vehicle frame 30 includes a portion for rotatably supporting the steering column 22, and the middle unit 60 may be supported by this portion.

The valve operation member 65N of the switching valve 65 is exposed outside the vehicle. With the above, the driver can readily access the valve operation member 65N. The middle unit 60 is disposed such that the valve housing unit 69 is positioned on the upper side of the middle cylinder 62. The valve operation member 65N of the switching valve 65 is exposed upward between the steering column 22 and the display unit 7. That is, the snowmobile 100 does not include a cover or a part that covers the upper side of the valve operation member 65N. The layout of the middle unit 60 is not limited to the example described here. For example, the operation members 63m, 63n of the respective throttles 63R, 63L may be exposed upward between the steering column 22 and the display unit 7. In another example, the upper side of the operation members 65N, 63m, 63n may be covered by a cover that can be opened and closed.

As described above, in the snowmobile 100, the valve operation member 65N is positioned in the vicinity of the steering handle 21. Therefore, a driver can readily access the valve operation member 65N. The fact that the "valve operation member 65N is positioned in the vicinity of the steering handle 21" means that the valve operation member 65N is positioned within a reach of a driver sitting on the seat 8. The valve operation member 65N may be mounted on the steering handle 21 itself.

[Example of Four-wheeled Vehicle]

Figure 12:
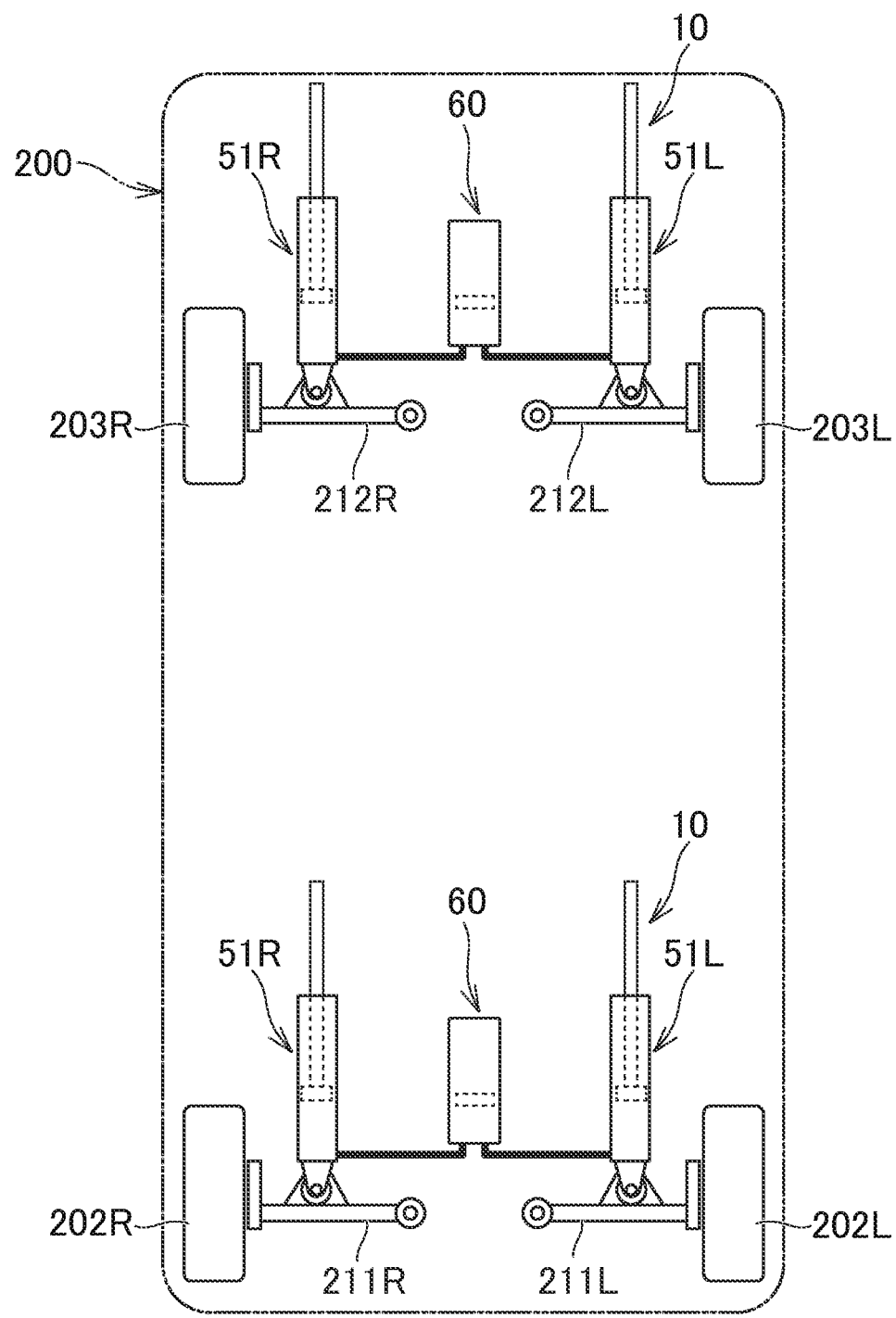
FIG. 12 is a schematic diagram of a four-wheeled vehicle, that is an example of a vehicle including a damping system mounted thereon.

The damping system 10, 110 may be mounted on a four-wheeled vehicle. FIG. 12 shows an example of a four-wheeled vehicle 200 including the damping system 10 mounted thereon. The four-wheeled vehicle 200 may be an ATV, a ROV, etc., for example.

The four-wheeled vehicle 200 includes four wheels 202R, 202L, 203R, 203L as the vehicle body support members. The four-wheeled vehicle 200 includes arms 211R, 211L, 212R, 212L for connecting the respective wheels 202R, 202L, 203R, 203L and the vehicle body frame. In the example of the four-wheeled vehicle 200, one damping system 10 is provided to the left and right front wheels 202R, 202L, and another damping system 10 is provided to the left and right rear wheels 203R, 203L. That is, the lower end portion of the right damper 51R of the front damping system 10 (the end portion of the cylinder 52 in the example of FIG. 12) is connected to the arm 211R that supports the front wheel 202R, and the lower end portion of the left damper 51L is connected to the arm 211L that supports the front wheel 202L. Similarly, the lower end portion of the right damper 51R of the rear damping system 10 (the end portion of the cylinder 52 in the example in FIG. 12) is connected to the arm 212R that supports the rear wheel 203R, and the lower end portion of the left damper 51L is connected to the arm 212L that supports the rear wheel 203L.

In the four-wheeled vehicle 200 as well, an actuator (for example, a stepping motor) for rotating the valve main body 65M, instead of the valve operation member 65N, may be mounted on the middle unit 60. Further, an operation member (for example, a button) for a driver to operate the stepping motor may be placed in the vicinity of the steering handle in the driver seat.

An automobile including the damping system 10 is not limited to the example of the four-wheeled vehicle 200 shown in FIG. 12. For example, one damping system 10 may be provided to the right front wheel 202R and the right rear wheel 203R, and another damping system 10 may be provided to the left front wheel 202L and the left rear wheel 203L. As still another example, one damping system 10 may be provided to the right front wheel 202R and the left rear wheel 203L, and another damping system 10 may be provided to the left front wheel 202L and the right rear wheel 203R.

The present invention is not limited to the above described embodiments, and can be modified in various manners.

For example, the middle cylinder 62 may not fee provided to the oil channel that connects the right damper 51R and the left damper 51L.

Further, the middle unit 60 may not be positioned at the center in the width direction of the vehicle body. For example, the middle unit 60 may be fixed to the right side portion or left side portion of the vehicle body frame.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A vehicle damping system, comprising:
   a first damper comprising a first cylinder filled with oil and a first piston separating an inside of the first cylinder into two oil chambers, the first piston comprising an orifice for communication between the two oil chambers, the first piston being configured to move in the first cylinder in accordance with a vertical movement of a first vehicle body support member that supports a vehicle body;
   a second damper comprising a second cylinder filled with oil and a second piston separating an inside of the second cylinder into two oil chambers, the second piston comprising an orifice for communication between the two oil chambers, the second piston being configured to move in the second cylinder in accordance with a vertical movement of a second vehicle body support member that supports the vehicle body; and
   an oil channel that connects the first cylinder and the second cylinder and allows oil to move between the first cylinder and the second cylinder,
   wherein
   the oil channel comprises a first oil channel connected to the first cylinder, a second oil channel connected to the second cylinder, and a switching valve arranged between the first oil channel and the second oil channel,
   the switching valve comprises a valve main body having a first switching channel formed therein for connecting the first oil channel and the second oil channel, and the valve main body is rotatable to a first position where the first switching channel connects the first oil channel and the second oil channel to each other and to a second position different from the first position.

2. The vehicle damping system according to claim 1, further comprising a middle cylinder that comprises a piston, an oil chamber, and a gas chamber, the piston separating the middle cylinder into the oil chamber and the gas chamber, wherein
the first oil channel and the second oil channel are connected to the oil chamber of the middle cylinder,
the oil channel comprises a first bypass channel connecting the first oil channel and the second oil channel to each other without going through the oil chamber of the middle cylinder,
the switching valve is arranged in the first bypass channel, and
when the switching valve is at the first position, the first bypass channel connects the first oil channel and the second oil channel via the first switching channel.

3. The vehicle damping system according to claim 1, wherein
the valve main body has a second switching channel formed therein, the second switching channel connects the first oil channel and the second oil channel to each other when the valve main body is arranged at the second position, and
the valve main body is rotatable to the first position, the second position, and a third position,
wherein when the valve main body is in the third position the valve main body disconnects the first oil channel and the second oil channel from each other.

4. The vehicle damping system according to claim 1, wherein the switching valve includes an operation member for operating the valve main body, and the operation member is rotatable integrally with the valve main body.

5. A vehicle damping system, comprising:
a first damper comprising a first cylinder filled with oil and a first piston that separates an inside of the first cylinder into two oil chambers, the first piston comprising an orifice for communication between the two oil chambers, the first piston being configured to move in the first cylinder in accordance with a vertical movement of a first vehicle body support member that supports a vehicle body;
a second damper comprising a second cylinder filled with oil and a second piston that separates an inside of the second cylinder into two oil chambers, the second piston comprising an orifice for communication between the two oil chambers, the second piston being configured to move in the second cylinder in accordance with a vertical movement of a second vehicle body support member that supports the vehicle body; and
an oil channel that connects the first cylinder and the second cylinder to each other and allows oil to move between the first cylinder and the second cylinder,
wherein
the oil channel comprises a first oil channel connected to the first cylinder, a second oil channel connected to the second cylinder, and a switching valve arranged between the first oil channel and the second oil channel,
the switching valve comprises a valve main body comprising a first switching channel and a second switching channel each formed therein, and
the valve main body is switchable into a first state in which the first switching channel connects the first oil channel and the second oil channel to each other, a second state in which the second switching channel connects the first oil channel and the second oil channel to each other, and a third state in which the valve main body disconnects the first oil channel and the second oil channel from each other.

6. The vehicle damping system according to claim 5, further comprising a middle cylinder comprising a piston, an oil chamber, and a gas chamber, the piston separating the middle cylinder into the oil chamber and the gas chamber, wherein
the first oil channel and the second oil channel are connected to the oil chamber of the middle cylinder,
the oil channel comprises a first bypass channel for connecting the first oil channel and the second oil channel without going through the oil chamber of the middle cylinder, and
when the switching valve is in the first state, the first bypass channel connects the first oil channel and the second oil channel via the first switching channel.

7. The vehicle damping system according to claim 5, wherein
when the switching valve is in the first state, the first bypass channel connects the first oil channel and the second oil channel via the first switching channel,
when the switching valve is in the second state, the first bypass channel connects the first oil channel and the second oil channel via the second switching channel, and
the second switching channel creates a larger resistance against oil flow than the first switching channel.

8. The vehicle damping system according to claim 6, wherein
the oil channel, comprises a first throttle arranged in the first oil channel, a second throttle arranged in the second oil channel, and a second bypass channel for connecting the first oil channel and the second oil channel to the middle cylinder without going through the first throttle and the second throttle,
when the switching valve is in the first state, the first bypass channel connects the first oil channel and the second oil channel via the first switching channel, and
when the switching valve is in the second state, the second switching channel connects the first oil channel and the second oil channel to the second bypass channel.

9. The vehicle damping system according to claim 5, wherein the valve main body is rotatable to a position corresponding to the first state, a position corresponding to the second state, and a position corresponding to the third state.

10. A vehicle, comprising:
a vehicle damping system comprising:
a first damper comprising a first cylinder filled with oil and a first piston separating an inside of the first cylinder into two oil chambers, the first piston comprising an orifice for communication between the two oil chambers, the first piston being configured to move in the first cylinder in accordance with a vertical movement of a first vehicle body support member that supports a vehicle body;
a second damper comprising a second cylinder filled with oil and a second piston separating an inside of the second cylinder into two oil chambers, the second piston comprising an orifice for communication between the two oil chambers, the second piston being configured to move in the second cylinder in accordance with a vertical movement of a second vehicle body support member that supports the vehicle body; and an oil channel that connects the first cylinder and the second cylinder and allows oil to move between the first cylinder and the second cylinder, wherein the oil channel comprises a first oil channel connected to the first cylinder, a second oil channel connected to the second cylinder, and a switching valve arranged between the first oil channel and the second oil channel, the switching valve comprises a valve main body having a first switching channel formed therein for connecting the first oil channel and the second oil channel, the valve main body is rotatable to a first position where the first switching channel connects the first oil channel and the second oil channel to each other and to a second position different from the first position;

the first vehicle body support member;

the second vehicle body support member;

a first arm connecting the first vehicle body support member and a vehicle body such that the first vehicle body support member is movable up and down relative to the vehicle body; and a second arm connecting the second vehicle body support member and the vehicle body such that the second vehicle body support member is movable up and down relative to the vehicle body, wherein the first damper is connected to the vehicle body and the first arm, and the second damper is connected to the vehicle body and the second arm.

11. The vehicle according to claim 10, wherein the switching valve comprises a valve operation member for operating the valve main body, and the valve operation member is exposed outside the vehicle body.

12. The vehicle according to claim 10, further comprising:

a steering handle for steering the first vehicle body support member and the second vehicle body support member, and a display unit, wherein the switching valve comprises a valve operation member for operating the valve main body, and the valve operation member is disposed between the steering handle and the display unit.

* * * * *